US011800430B2

(12) United States Patent
Wei et al.

(10) Patent No.: US 11,800,430 B2
(45) Date of Patent: Oct. 24, 2023

(54) METHODS, WIRELESS COMMUNICATIONS NETWORKS AND INFRASTRUCTURE EQUIPMENT

(71) Applicant: Sony Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 401 days.

(21) Appl. No.: 17/278,727

(22) PCT Filed: Oct. 29, 2019

(86) PCT No.: PCT/EP2019/079526
§ 371 (c)(1),
(2) Date: Mar. 23, 2021

(87) PCT Pub. No.: WO2020/089225
PCT Pub. Date: May 7, 2020

(65) Prior Publication Data
US 2022/0038994 A1 Feb. 3, 2022

(30) Foreign Application Priority Data

Nov. 1, 2018 (EP) .................................... 18204001

(51) Int. Cl.
*H04W 40/34* (2009.01)
*H04W 40/04* (2009.01)
(Continued)

(52) U.S. Cl.
CPC ........... *H04W 40/34* (2013.01); *H04W 40/04* (2013.01); *H04W 40/12* (2013.01); *H04W 40/22* (2013.01); *H04W 84/047* (2013.01)

(58) Field of Classification Search
None
See application file for complete search history.

(56) References Cited

U.S. PATENT DOCUMENTS 11,483,747 B2 * 10/2022 Hong .................... H04W 36/08
2013/0010604 A1 1/2013 Zhang et al.
(Continued)

FOREIGN PATENT DOCUMENTS

WO 2018/182286 A1 10/2018

OTHER PUBLICATIONS

International Search Report and Written Opinion dated Dec. 13, 2019, received for PCT Application PCT/EP2019/079526, Filed on Oct. 29, 2019, 20 pages.
(Continued)

*Primary Examiner* — Brian S Roberts
(74) *Attorney, Agent, or Firm* — XSENSUS LLP

(57) ABSTRACT

A method of controlling communications within a wireless communications network is provided. The method comprises communicating, with a first infrastructure equipment acting as a donor node connected to a core network, signals representing data by a second infrastructure equipment over a first communications path via one or more other infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node.

20 Claims, 13 Drawing Sheets

(51) Int. Cl.
  *H04W 40/12* (2009.01)
  *H04W 40/22* (2009.01)
  *H04W 84/04* (2009.01)

(56) References Cited

U.S. PATENT DOCUMENTS

| | | | |
|---|---|---|---|
| 2015/0208316 A1 | 7/2015 | Mosko et al. | |
| 2018/0091416 A1* | 3/2018 | Ghosh | H04L 45/123 |
| 2019/0327660 A1* | 10/2019 | Hong | H04W 40/38 |
| 2020/0053629 A1* | 2/2020 | Majmundar | H04W 36/023 |
| 2020/0092784 A1* | 3/2020 | Hampel | H04W 40/34 |

OTHER PUBLICATIONS

Sony, "Route Management in IAB", 3GPP TSG RAN WG2 Meeting #103, R2-1811418, Aug. 20-24, 2018, 3 pages.
Sony, "Discussion on NR Enhancements to Support IAB", 3GPP TSG RAN WG1 Meeting #93, R1-1806572, May 21-25, 2018, 4 pages.
Holma et al., "LTE for UMTS OFDMA and SC-FDMA Based Radio Access", John Wiley and Sons, 2009, pp. 25-27.
Huawei et al., "Revised Work Item Proposal: Enhancements of NB-IoT", 3GPP TSG RAN Meeting #73, RP-161901, Sep. 19-22, 2016, 8 pages.
AT&T et al., "New SID Proposal: Study on Integrated Access and Backhaul for NR", 3GPP RAN Meeting #75, RP-170821, Mar. 6-9, 2017, 5 pages.
3GPP, "Study on Integrated Access and Backhaul; (Release 15)", TR 38.874 V0.1.0, Feb. 2018, pp. 1-11.
Qualcomm et al., "Proposals on IAB Architecture", 3GPP TSG-RAN WG2 NR Ad hoc 1801, R2-1801606, Jan. 22-26, 2018, 7 pages.
Qualcomm et al., "Way Forward—IAB Architecture for L2/3 Relaying", 3GPP TSG-RAN WG3 Meeting #99, R3-181502, Jan. 26-Mar. 2, 2018, 6 pages.
Samsung, "IAB Failure Recovery as Part of Route Management", 3GPP TSG-RAN WG3 Meeting #101, R3-185312, Aug. 20-24, 2018, 2 pages.
"Bridges and Bridged Networks", IEEE Computer Society, IEEE Std 802.1Q™, 2014, pp. 1-1767.
Qualcomm et al., "Way Forward—IAB Architecture for L2/3 Relaying", 3GPP TSG-RAN WG3 Meeting #99bis, R3-181944, Apr. 16-20, 2018, 6 pages.
3GPP, "Evolved Universal Terrestrial Radio Access (E-UTRA); Layer 2—Measurements (Release 15)", TS 36.314 V15.1.0, Jul. 2018, pp. 1-28.
3GPP, "NR; Radio Resource Control (RRC) Protocol Specification (Release 15)", TS 38.331 V15.3.0, Sep. 2018, pp. 1-445.

* cited by examiner

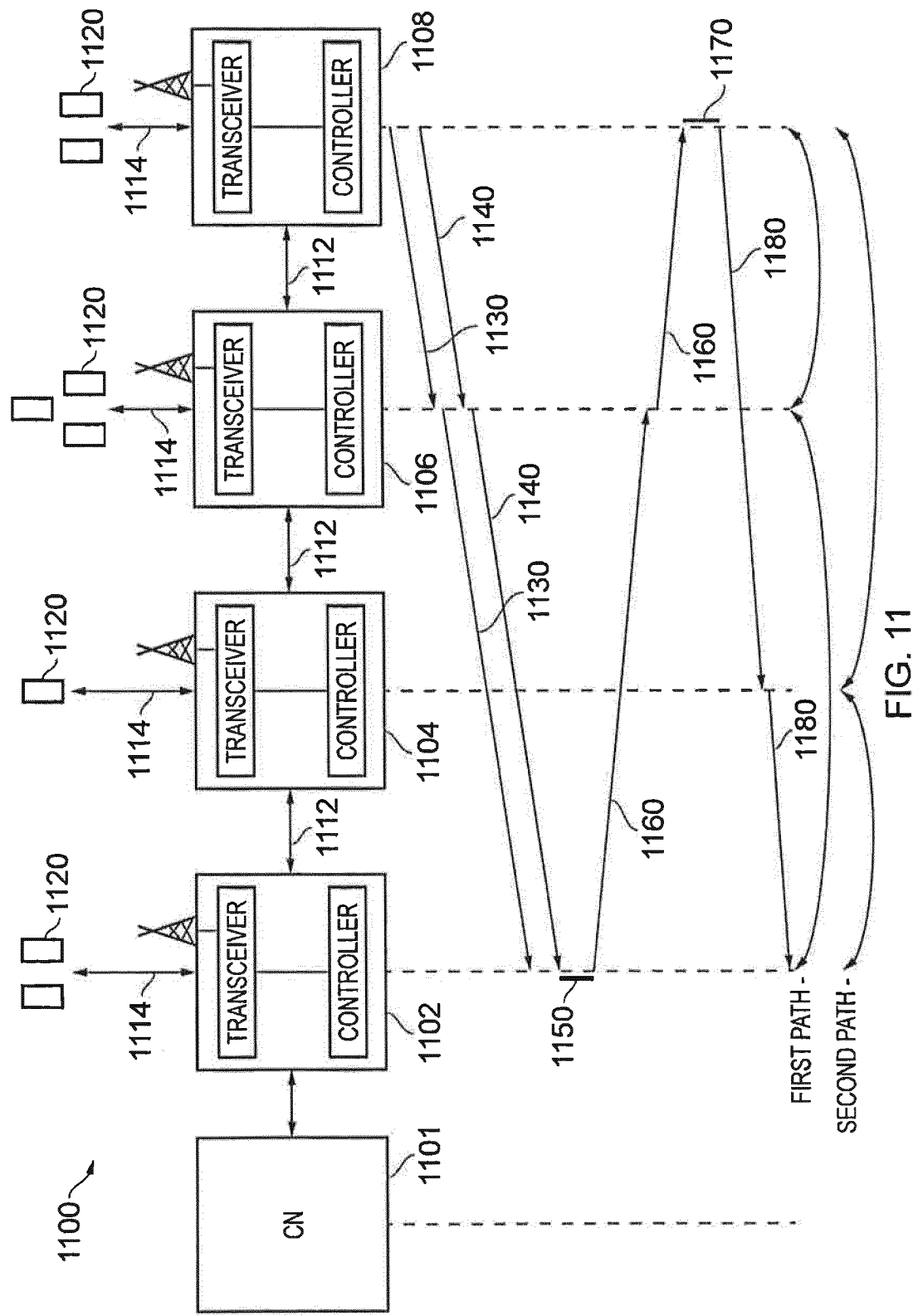

METHODS, WIRELESS COMMUNICATIONS NETWORKS AND INFRASTRUCTURE EQUIPMENT

CROSS-REFERENCE TO RELATED APPLICATIONS

The present application is based on PCT filing PCT/EP2019/079526, filed Oct. 29, 2019, which claims priority to EP 18204001.4, filed Nov. 1, 2018, the entire contents of each are incorporated herein by reference.

BACKGROUND

Field of Disclosure

The present disclosure relates to methods and apparatus for the communication of signals between various infrastructure equipment, communications devices and the core network on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this there is a need to ensure that a donor infrastructure equipment that is physically connected to the core network does not suffer from a "capacity crunch" when a large amount of data is being transmitted from various communications devices and infrastructure equipment to the core network via the donor infrastructure equipment.

SUMMARY OF THE DISCLOSURE

The present disclosure can help address or mitigate at least some of the issues discussed above as defined in the appended claims.

Embodiments of the present technique can provide a method of controlling communications within a wireless communications network. The wireless communications network comprises a plurality of infrastructure equipment each being configured to communicate with one or more others of the infrastructure equipment via a backhaul communications link, one or more of the infrastructure equipment each being configured to communicate with one or more communications devices via an access link. The method comprises communicating, with a first of the infrastructure equipment acting as a donor node connected to a core network, the core network being part of the wireless communications network, signals representing data by a second of the infrastructure equipment over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, transmitting, by the child node to the donor node over the first communications path, local assistance information associated with the child node, determining, by the donor node based on the local assistance information associated with the child node, values of a communications criterion associated with each of the first communications path and one or more other communications paths between the child node and either the donor node or a second donor node via one or more others of the infrastructure equipment acting as relay nodes, the first communications path and the one or more other communications paths being different, receiving, by the child node from the donor node via the parent node or from the parent node, the values of the communications criterion associated with each of the first communications path and the one or more other communications paths, determining, by the child node, that the value of the communications criterion associated with a second communications path which is one of the one or more other communications paths is superior to the value of the communications criterion associated with the first communications path, and communicating, by the child node, with the donor node over the second communications path.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 11 shows a part schematic, part message flow diagram of communications in a wireless communications system in accordance with embodiments of the present technique;

DETAILED DESCRIPTION OF THE EMBODIMENTS

Long Term Evolution (LTE) Wireless Communications System

Figure 1:
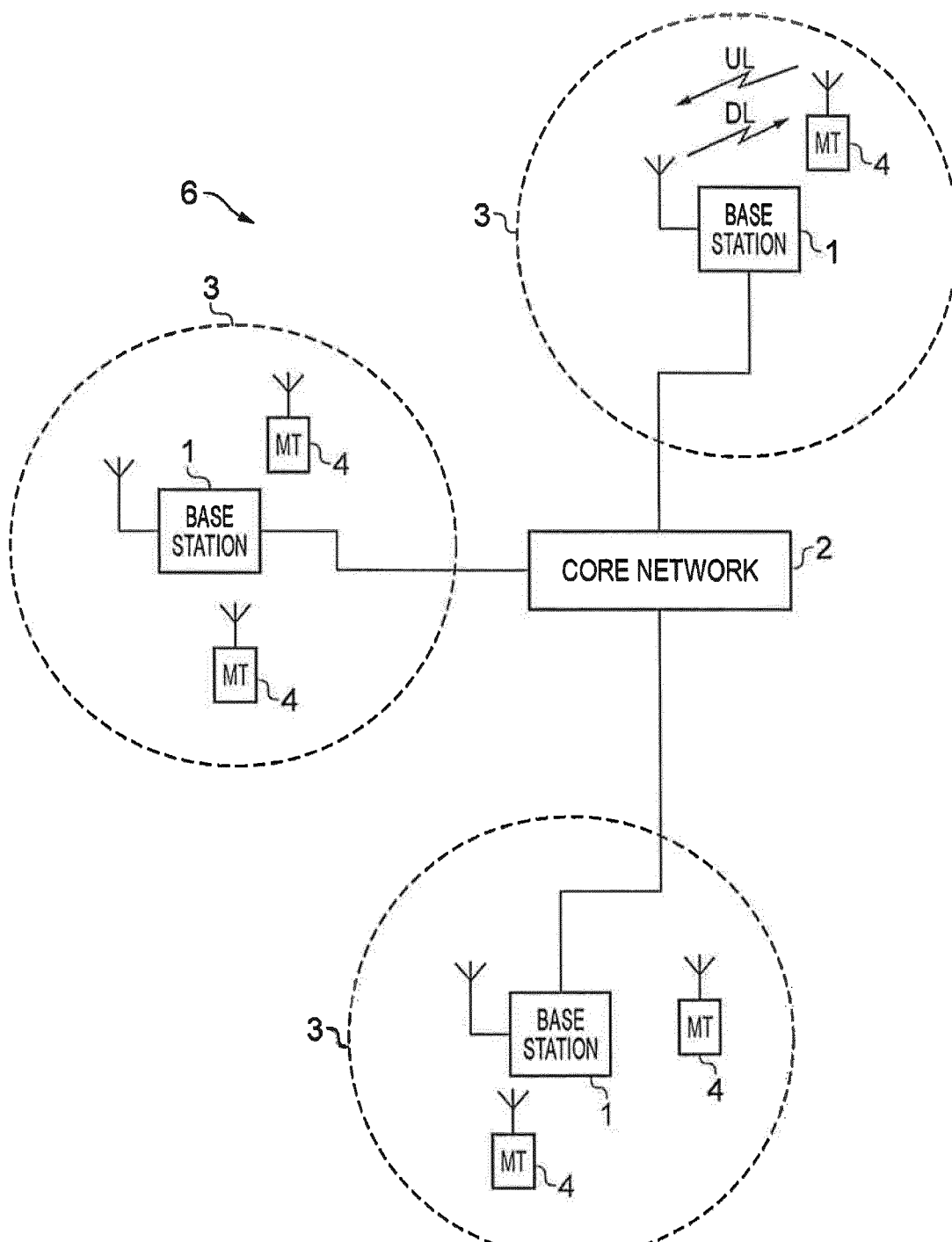
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
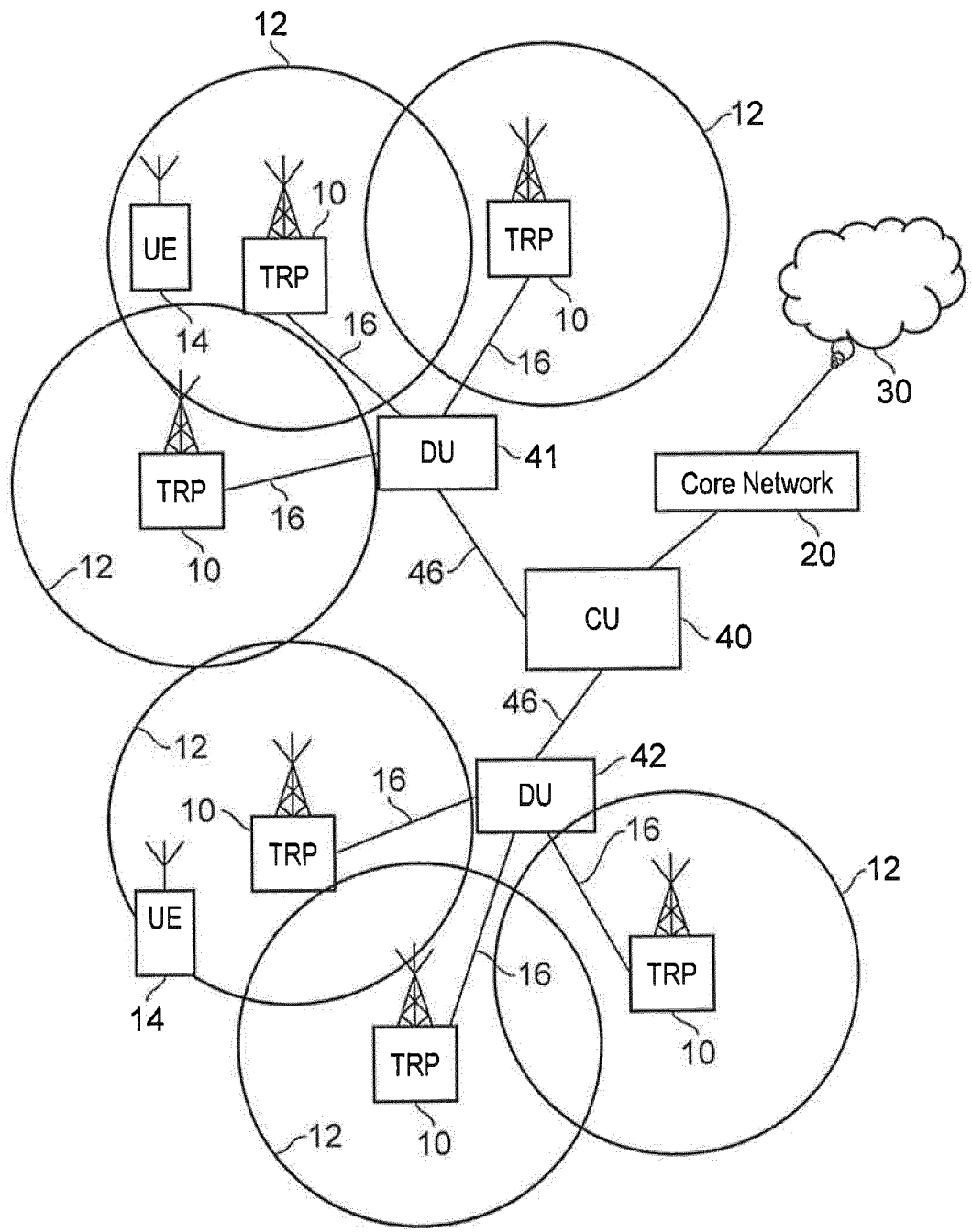
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
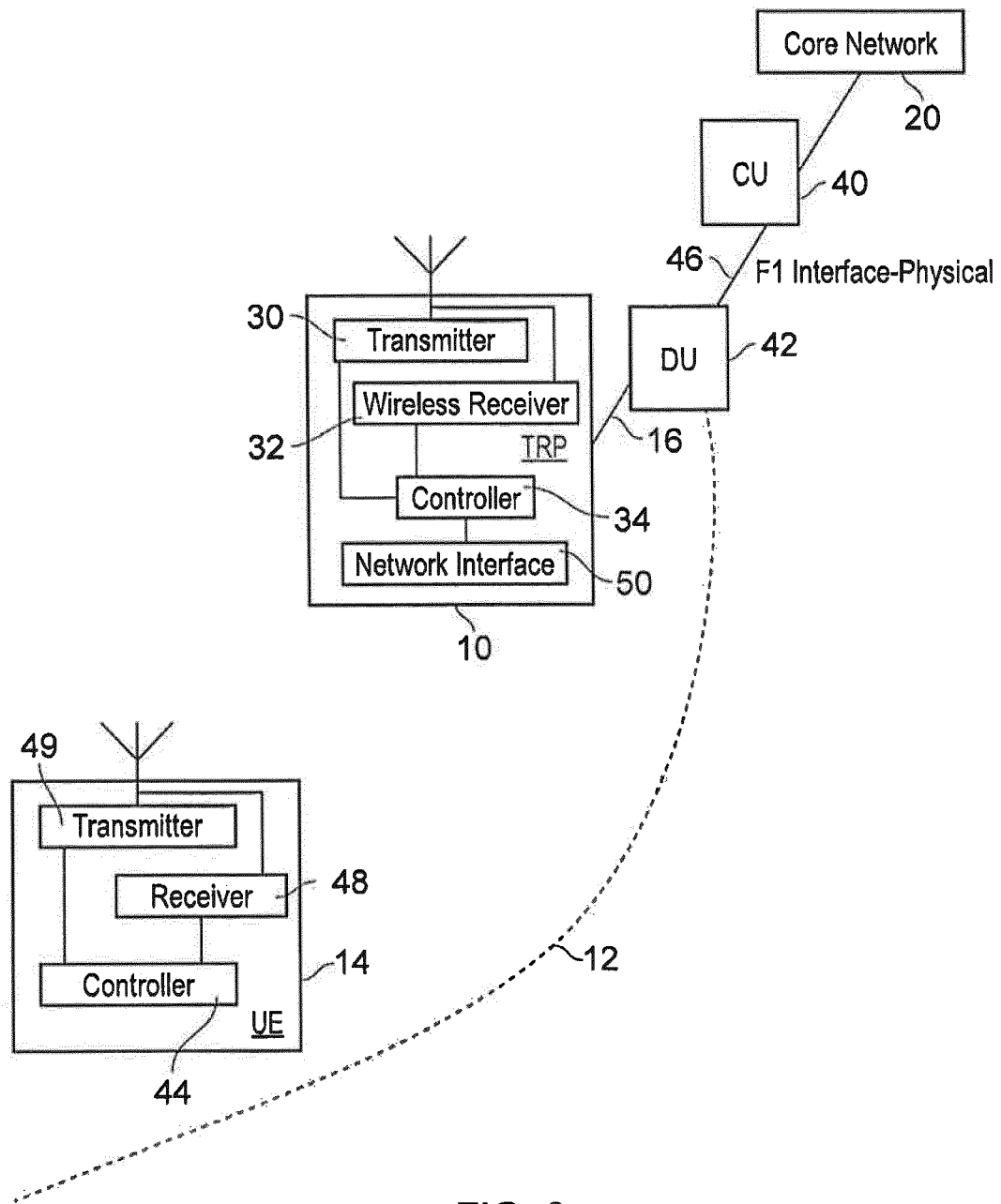
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

Figure 4:
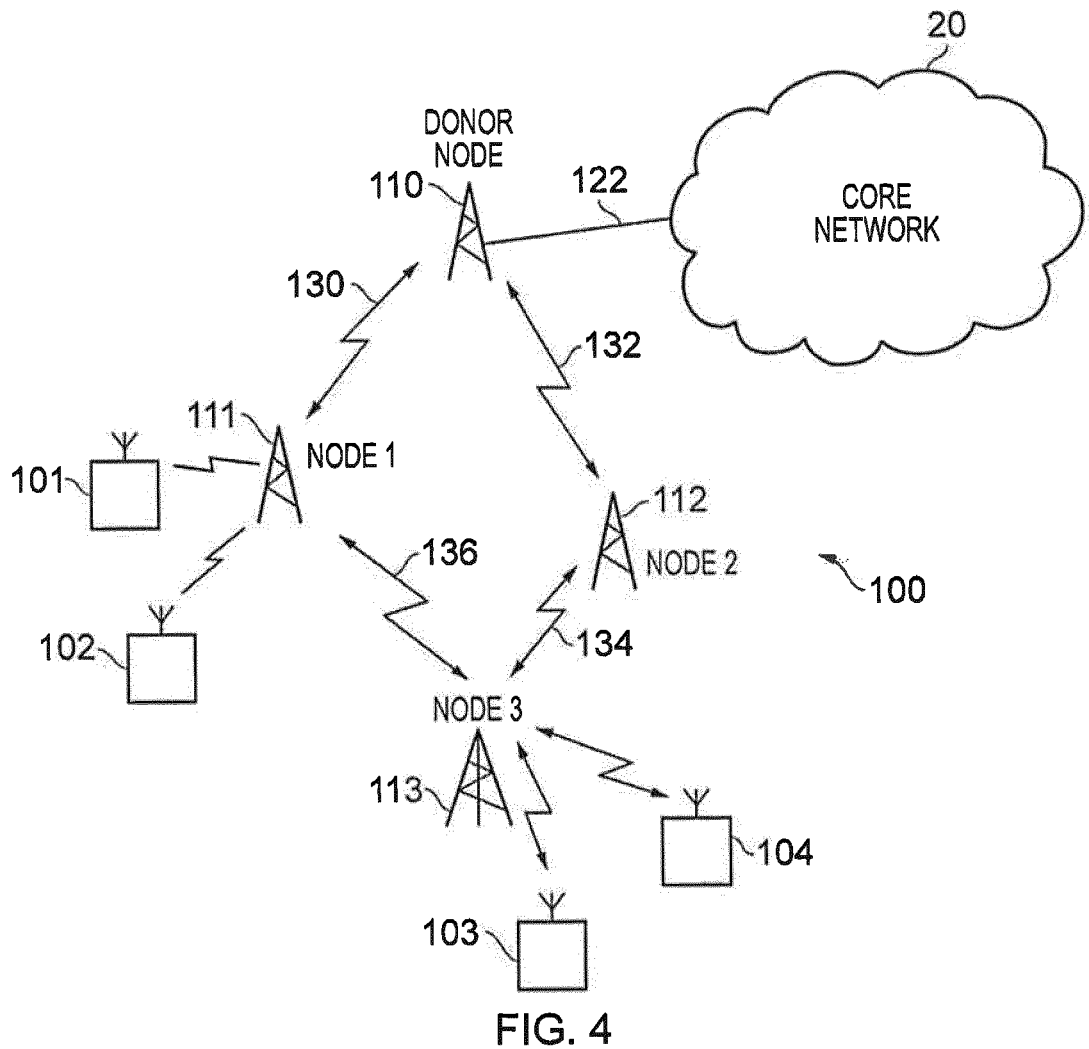
FIG. 4 schematically represents some aspects of an example wireless telecommunication network which may be configured to operate in accordance with certain embodiments of the present disclosure.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink.

The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a series of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no direct physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via other infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity or infrastructure equipment which forms a part of a route for the transmission of the uplink data or the downlink data.

An infrastructure equipment which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment act as relay nodes on the backhaul link, they may also provide service to communications devices. The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure equipment 110, being connected to the core network 20, transmits the uplink data to the core network 20.

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink/downlink data from/to a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are described in which each of the nodes is an infrastructure equipment; the present disclosure is not so limited. A node may comprise at least a transmitter, a receiver and a controller. In some arrangements of the present technique, the functionality of a node (other than the donor node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some arrangements of the present technique, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some arrangements of the present technique, a wireless access interface used for the transmission of data from one node to another uses a first technique and a wireless access interface used for the transmission of data between an infrastructure equipment acting as a node and a communications device may use a second technique different from the first. In some arrangements of the present technique, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+ ("3G"), LTE and related standards including LTE-A ("4G"), and NR ("5G"). Techniques that may be used to provide a wireless access interface include one or more of TDMA, FDMA, OFDMA, SC-FDMA, CDMA. Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Integrated Access and Backhaul (IAB) for NR

A new study item on Integrated Access and Backhaul for NR [3] has been approved. Several requirements and aspects for the integrated access and wireless backhaul for NR to address are discussed in [3], which include:

Efficient and flexible operation for both inband and outband relaying in indoor and outdoor scenarios;
Multi-hop and redundant connectivity;
End-to-end route selection and optimisation;
Support of backhaul links with high spectral efficiency;
Support of legacy NR UEs.

The stated objective of the study detailed in [3] is to identify and evaluate potential solutions for topology management for single-hop/multi-hop and redundant connectivity, route selection and optimisation, dynamic resource allocation between the backhaul and access links, and achieving high spectral efficiency while also supporting reliable transmission.

Figure 5:
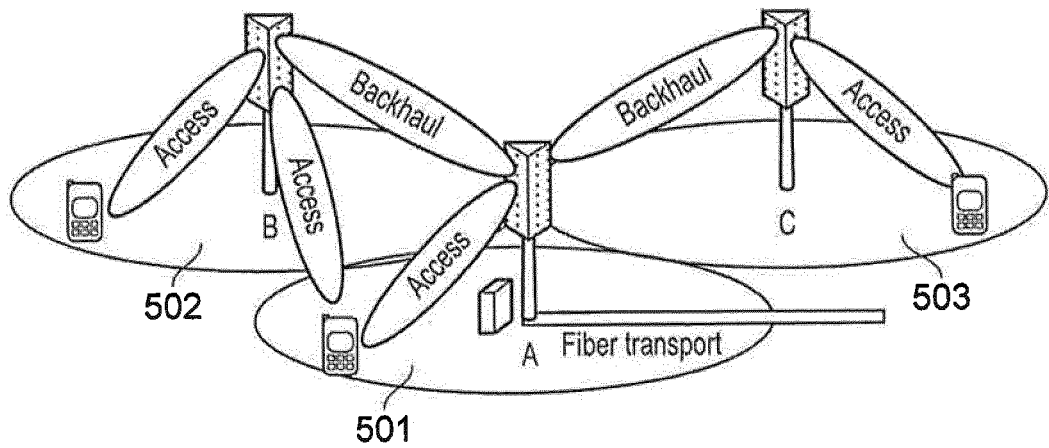
FIG. 5 is reproduced from [3], and provides a first example of an Integrated Access and Backhaul (IAB) deployment scenario.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimisation of impact to core network specifications, consideration of impact to core networking signalling load, and Release 15 NR specifications should be reused as much as possible in the design of the backhaul link, with enhancements considered.

Figure 6A:
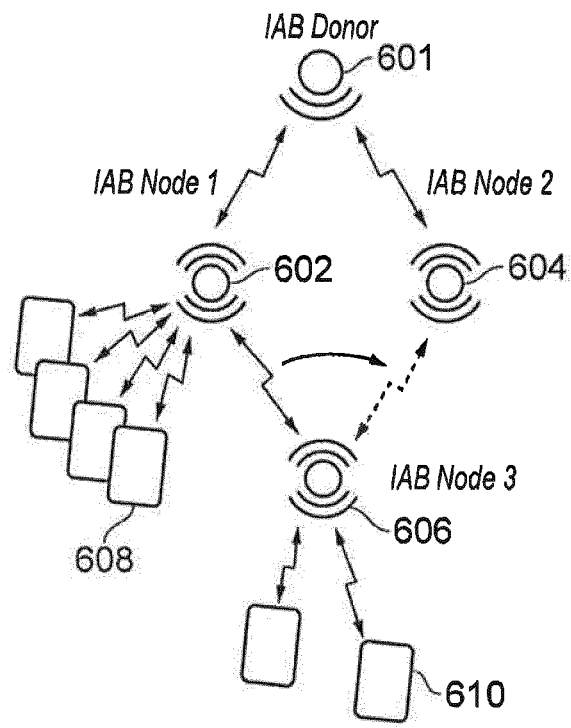
FIG. 6A is reproduced from [5], and provides a second example of an IAB deployment scenario in which there are multiple candidate routes each comprising multiple hops from the end node to the donor node.

FIG. 6A is reproduced from [5], and shows an example of a wireless communications system comprising a plurality of IAB-enabled nodes, which may for example be TRPs forming part of an NR network. These comprise an IAB donor node 601 which has a connection to the core network, two IAB nodes (a first IAB node 602 and a second IAB node 604) which have backhaul connections to the IAB donor node 601, and a third IAB node 606 (or end IAB node) which has a backhaul connection to each of the first IAB node 602 and the second IAB node 604. Each of the first IAB node 601 and third IAB node 606 have wireless access connections to UEs 608 and 610 respectively. As shown in FIG. 6A, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 link. Hence, knowing how to manage the candidate routes efficiently and effectively is important to ensure timely data transmission between relay nodes, especially when considering the characteristics of wireless links.

In the case that the link between the first IAB node 602 and the third IAB node 606 is deteriorating, or the first IAB node 602 becomes overloaded, one of the nodes in the system (this could be the donor node 601 or the first IAB node 602 itself) will need to make a decision to change the route from the third IAB node 606 to the IAB donor node 601 from that via the first IAB node 602 to that via the second IAB node 604.

In FIG. 6A, only the IAB Donor gNB 601 has a fixed line backhaul into the core network. It should be assumed in this case that the traffic from all the UEs 610 within the third IAB node's 606 coverage is backhauled firstly to the first IAB node 602. This backhaul link must compete for capacity on the component carrier serving the first IAB Node 602 with all the UEs 608 within the coverage area of the first IAB Node 602. In the relevant art, the first IAB Node 602 in such a system as that of FIG. 6A is called a "hop"—it relays communications between the end (third) IAB node 606 and the donor IAB node 601. The backhaul link to the first IAB Node 602 requires enough capacity to support the traffic from all the UEs 610, bearing in mind that some of these may have stringent quality of service (QoS) requirements that translate into high traffic intensities.

Figure 6B:
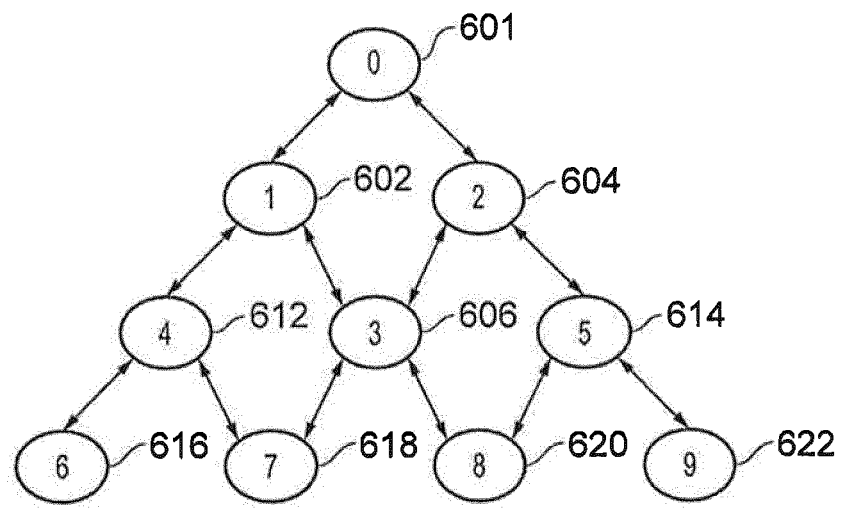
FIG. 6B is an extended version of FIG. 6A, providing a third example of an IAB deployment scenario in which there are multiple candidate routes each comprising multiple hops from the end node to the donor node.

FIG. 6B is an extended version of FIG. 6A, and shows what happens when there are multiple layers of IAB nodes in the deployment scenario. In the example of FIG. 6A, the third IAB node 606 is the child node of the first IAB node 602, and the first IAB node 602 may be the parent node of the third IAB node 606. However, a parent node may not necessarily be the next node up (i.e. one hop in the uplink direction) towards the IAB donor node 601. A parent node may be more than one hop away from its child node or children nodes, and is in a general sense configured to allocate uplink communications resources to the child node. For example, the donor IAB node 601 may in fact be the parent node of the third IAB node 606. This is shown with greater clarity in FIG. 6B.

In FIG. 6B, in addition to IAB node 601, 602, 604 and 606 as shown in FIG. 6A, there are additional IAB nodes 612 and 614 at the same layer or level of the network as IAB node 606. Below these are IAB nodes 616, 618, 620 and 622, which are now end nodes, in that they have no downlink backhaul connections to other IAB nodes. Here, it could be that the first IAB node 602 is still the parent of the third IAB node 606, but may also be the parent of IAB node 612. Further, the first IAB node 602 may be the parent of IAB nodes 616, 618 and 620 too, or may be a grandparent node to these nodes if nodes 606 and 612 are their parents. Furthermore, some child nodes may have multiple parent nodes, and can select from between them when transmitted uplink data in dependence on certain criteria, such as relative link qualities between the child node and its multiple parent nodes, or a relative load status between the parent nodes, for example.

Various architectures have been proposed in order to provide the IAB functionality. The below described embodiments of the present technique are not restricted to a particular architecture. However, a number of candidate architectures which have been considered in, for example, 3GPP document [6] are described below.

Figure 7:
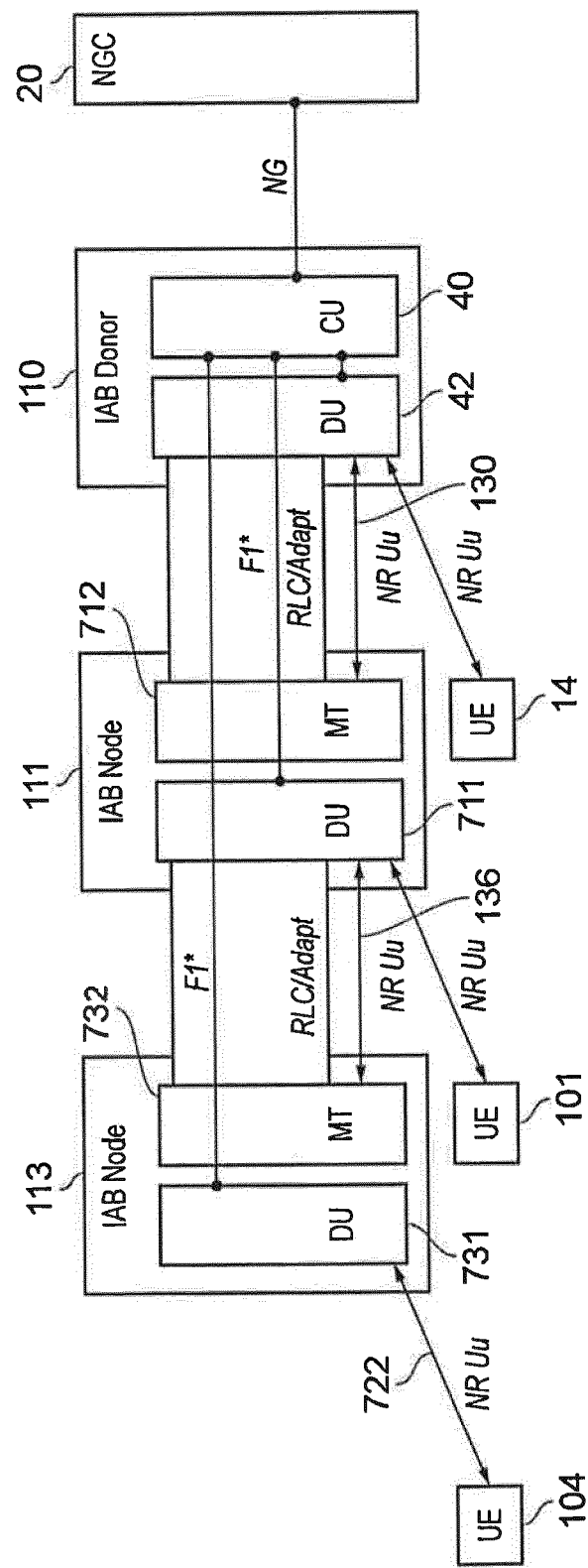
FIG. 7 is a block diagram illustrating a first possible network architecture for providing a wireless backhaul by means of IAB in a wireless telecommunication network which may be configured to operate in accordance with certain embodiments of the present disclosure.

FIG. 7 illustrates one possible architecture, sometimes referred to as "Architecture 1*a*", by which the donor Node 110, the Node 1 111 and the Node 3 113 may provide a wireless backhaul to provide connectivity for the UEs 104, 101, 14.

In FIG. 7, each of the infrastructure equipment acting as an IAB nodes 111, 113 and the donor node 110, includes a distributed unit (DU) 42, 711, 731 which communicates with the UEs 14, 101, 104 and (in the case of the DUs 42, 511 associated with the donor node 110 and the Node 1 111) with the respective downstream IAB nodes 111, 113. Each of the IAB nodes 111, 113 (not including the donor node 110) includes a mobile terminal (MT) 712, 732, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interface. The mobile terminals 712, 732 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 720 which is used by the Node 1 111 for communication with the donor node 110 may also be used by the UE 14 to transmit and receive data to and from the donor node 110.

Similarly, an end node (such as the Node 3 113) may provide a Uu wireless interface 722 for the fourth UE 104 to communicate with the DU 731 of the Node 3 113.

Figure 8:
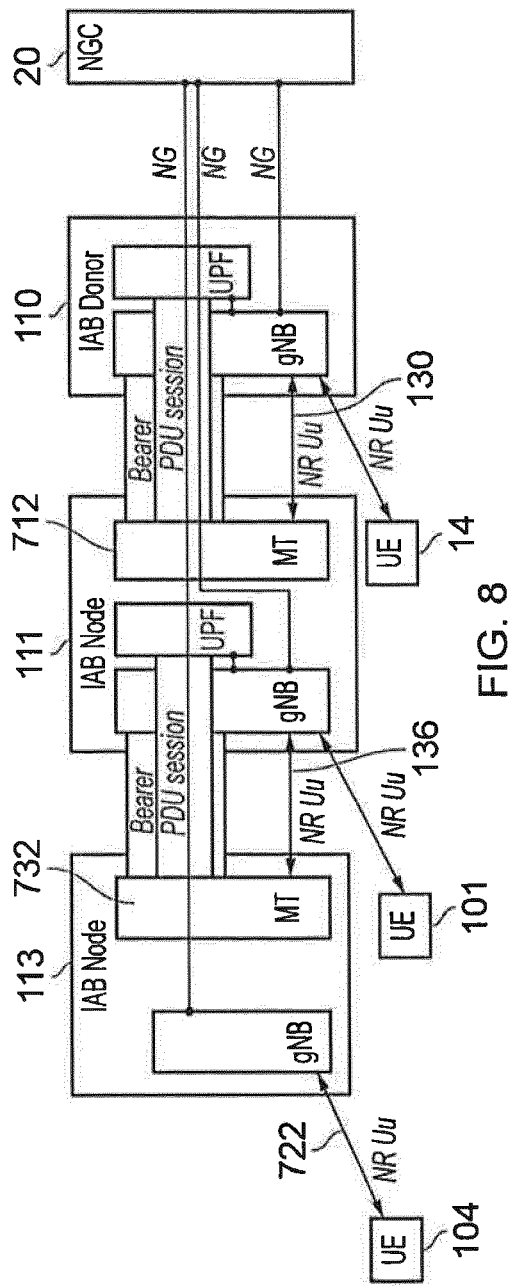
FIG. 8 is a block diagram illustrating a second possible network architecture for providing a wireless backhaul by means of IAB in a wireless telecommunication network which may be configured to operate in accordance with certain embodiments of the present disclosure.
Figure 9:
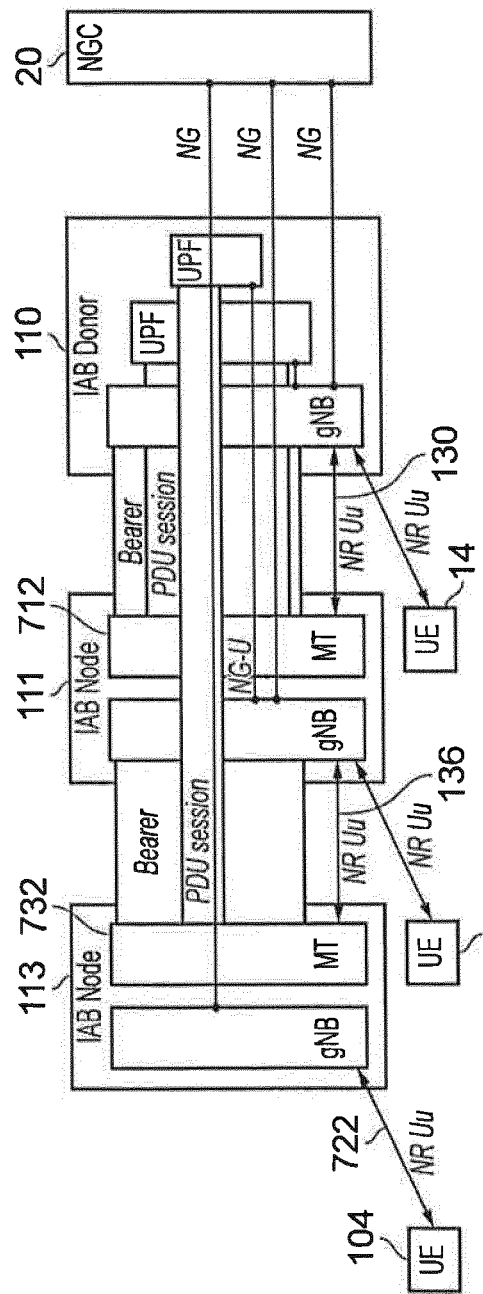
FIG. 9 is a block diagram illustrating a third possible network architecture for providing a wireless backhaul by means of IAB in a wireless telecommunication network which may be configured to operate in accordance with certain embodiments of the present disclosure.

Alternative candidate architectures for the provision of IAB are provided in FIG. 8 and FIG. 9, sometimes referred to as "Architectures 2a and 2b" respectively. In both FIG. 8 and FIG. 9, each IAB node includes a gNB function, providing a wireless access interface for the use of downstream IAB nodes and wireless communications devices.

FIG. 9 differs from FIG. 7 in that, in FIG. 7, PDU sessions are connected end-on-end to form the wireless backhaul; in FIG. 9, PDU sessions are encapsulated so that each IAB node may establish an end-to-end PDU session which terminates at the IAB donor node 110.

Given the vulnerable characteristics of wireless links, and considering multi-hops on the backhaul link, topology adaptation should be considered in the case that blockages or congestion occur in the backhaul link considering a given hop. It is therefore imperative to maximise the spectral efficiency of the backhaul link in order to maximise its capacity. Embodiments of the present technique seek to address the route change procedure; i.e. how, following a decision on a route change procedure, to carry out the route change procedure, hence enabling an efficient topology management.

There are many challenges to overcome and aspects to consider when providing such route change procedure solutions. Firstly, it must be determined how problems with routes are detected and how measurement reports and/or assistance information may be used to decide when routes should be changed with respect to the intermediate nodes. Such problems may include link quality deterioration of the route as a whole or at one or more of the nodes on the route, traffic loads at one or more of the nodes on the route, or capacity issues or a node status at one or more of the nodes on the route, such as a buffer status or a power headroom status. Secondly, the way in which route selection criteria and decision making must be determined. This includes the route selection meeting any QoS requirements, the securing of capacity, reserving of resources, admission control requirements and means by which the route can be adapted or simplified. Thirdly, it must be determined how the selected links or updated routes are indicated to the relevant nodes in the system. For example, an indication of a route change may be provided to all or a part of intermediate nodes on both the old route and the new route.

As described above with respect to FIGS. 7 to 9, different IAB architectures are proposed. Depending on the architecture, the route reselection and change may require different procedures (i.e. message flows). As described above with relation to FIGS. 6A and 6B, one of the nodes in a system will need to make a decision to change a route between two nodes when the link between these nodes is deteriorating, or one of the nodes becomes overloaded. Embodiments of the present technique seek to provide solutions to how the signalling to realise this procedure may be designed.

A number of radio link failure (RLF) scenarios have been agreed in [7]. These scenarios are illustrated and explained with respect to FIGS. 10A, 10B and 10C, which have been reproduced from [7]. Each of FIGS. 10A, 10B and 10C show example IAB networks each comprising two donor IAB nodes; donor node A1 1002 and donor node A2 1004.

Figure 10A:
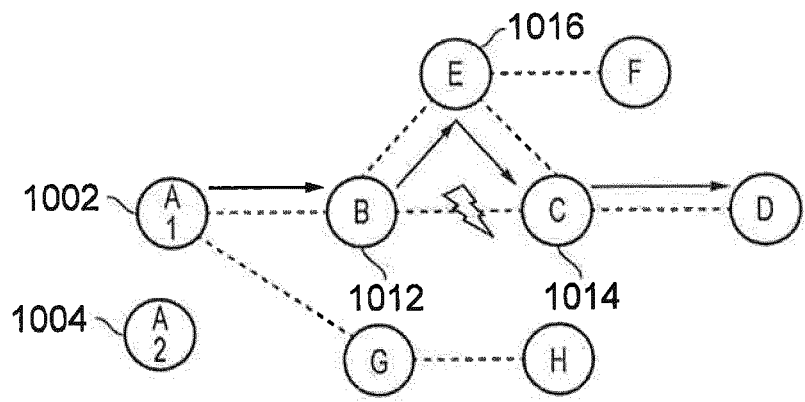
FIG. 10A is reproduced from [7], and shows a first example radio link failure example in IAB networks.

A first scenario is shown in FIG. 10A. Here, the RLF occurs between one of the parent IAB nodes (e.g. node B 1012) and the child IAB node (e.g., node C 1014), but the child node 1014 has an additional link established to another parent node, (e.g. node E 1016). When such an RLF occurs between the child node 1014 and parent node 1012, the child node 1014 can simply fall back on the other parent node 1016, which is able to relay communications between the child node 1014 and the donor node 1002 via the original parent node 1012.

Figure 10B:
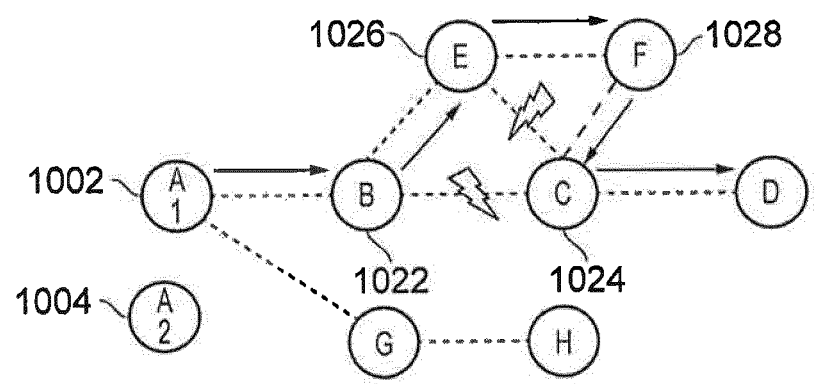
FIG. 10B is reproduced from [7], and shows a second example radio link failure example in IAB networks.

A second scenario is shown in FIG. 10B. Here, the RLF occurs between all parent IAB nodes (e.g., node B 1022 and E 1026) and the child IAB node (e.g., node C 1024). The child node 1024 therefore has no working links to any of its known parent nodes 1022, 1026, and so has to reconnect to a new parent node. In the example of FIG. 10B, the child node 1024 establishes a new connection with new parent node F 1028, which is able to relay communications between the child node 1024 and the donor node 1002 via both original parent nodes 1022, 1026.

Figure 10C:
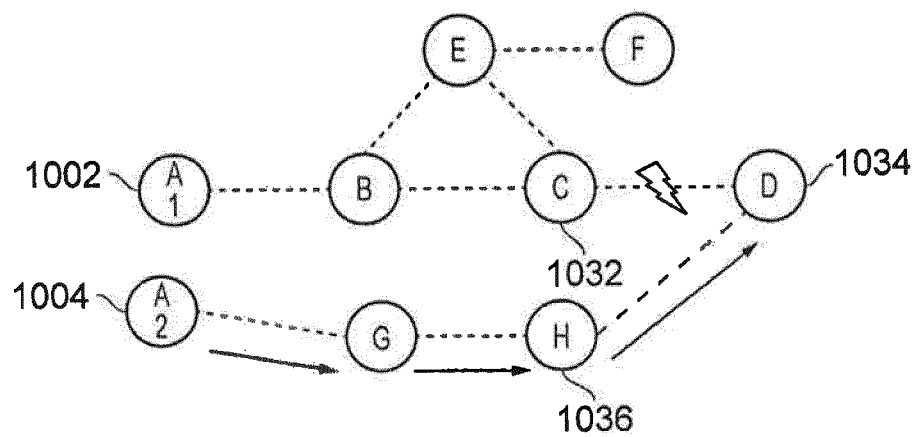
FIG. 10C is reproduced from [7], and shows a third example radio link failure example in IAB networks.

A third scenario is shown in FIG. 10C. Here, RLF occurs between a parent node C 1032 and its child node D 1034. However unlike the second scenario as described above by way of FIG. 10B, there are no candidates available as a new parent node for the child node 1034 to establish a new connection with in order to communicate to the donor node 1002. The child node 1034 therefore has to reconnect to the other IAB donor node 1004 via a new route. This is achieved by reconnecting to a new parent node on the new route, which in the example of FIG. 10C is IAB node H 1036. Thus, the child node 1034 is still able to communicate on the uplink to a donor node 1004 which is connected to the core network.

In relation to the description of the scenarios illustrated by FIGS. 10A, 10B and 10C, some co-pending applications of the present inventors address route change behaviour in view of the first scenario of FIG. 10A, where the child node already has an additional link established with another parent node (from the configured route table and via route change/route activation procedure). However, embodiments of the present technique propose solutions applicable for route change behaviour for the other scenarios; namely the second scenario as shown in FIG. 10B and the third scenario as shown in FIG. 10C, where the child node has to reconnect to a new parent node (this new route may not be included in the existing configured route table).

Those skilled in the art would appreciate that, although as shown by way of the examples of FIGS. 10A, 10B and 10C, RLF could be one of the factors to trigger route change, in IAB, route change can be triggered by a number of other factors, such as parent load overloading, link quality issues, etc. These other factors are described in greater detail below.

In summary, the problems addressed by embodiments of the present disclosure include:

When all of the pre-configured parent nodes are not available and the child node needs to reconnect to a new parent node, what are the criteria considered in the selection of a new parent node? (It should be noted that embodiments of the present technique can be applied for the route activation procedure as well as for the selection of a new parent node).

How should access assistance information be collected?

How should the result of evaluation of the local access assistance information be distributed to each IAB node?

How should the IAB nodes notify the result to their child nodes?

How should the signalling behaviour to realise the procedure of reconnecting to a new parent node or donor node be designed?

At least these problems are addressed by embodiments of the present technique, which are explained in detail below.

Route Change Procedure in IAB with Connection to a New Parent Node

FIG. 11 shows a part schematic, part message flow diagram of communications in a wireless communications network 1100 in accordance with embodiments of the present technique. The wireless communications network 1100 comprises a plurality of infrastructure equipment 1102, 1104, 1106, 1108 each being configured to communicate with one or more others of the infrastructure equipment 1102, 1104, 1106, 1108 via a backhaul communications link 1112, one or more of the infrastructure equipment 1102, 1104, 1106, 1108 each being configured to communicate with one or more communications devices 1120 via an access link 1114. A second of the infrastructure equipment 1108 comprises transceiver circuitry 1108a and controller circuitry 1108b which are configured in combination to communicate 1130, with a first of the infrastructure equipment 1102 acting as a donor node connected to a core network 1101 part of the wireless communications network 1100, signals representing data over a first communications path via one or more others of the infrastructure equipment 1106 acting as relay nodes, the second infrastructure equipment 1108 being a child node and one of the one or more other infrastructure equipment 1106 acting as the relay nodes or the donor node being a parent node, the parent node 1106 being connected to the child node 1108 via a backhaul communications link and configured to allocate uplink communications resources to the child node 1108, and to transmit 1140, to the donor node 1102 over the first communications path, local assistance information associated with the child node 1108, and the donor node 1102 is configured to determine 1150, based on the local assistance information associated with the child node 1108, values of a communications criterion associated with each of the first communications path and one or more other communications paths between the child node 1108 and either the donor node 1102 or a second donor node via one or more others of the infrastructure equipment 1104 acting as relay nodes, the first communications path and the one or more other communications paths being different, and the child node 1108 is configured to receive 1160, from the donor node 1102 via the parent node 1106 or directly from the parent node 1106 (if the parent node itself determines the communications criterion or otherwise determines that the child node should switch between routes/parent nodes), the values of the communications criterion associated with each of the first communications path and the one or more other communications paths, to determine 1170 that the value of the communications criterion associated with a second communications path which is one of the one or more other communications paths is superior to the value of the communications criterion associated with the first communications path, and to communicate 1180 with the donor node 1102 over the second communications path.

The example of FIG. 11 shows both the first communications path and the second communications path as being routes between the child node 1108 and the original donor node 1102, but some or all of the one or more other communications paths could be routes between the child node 1108 and a second donor node which is different to the original donor node 1102. It should also be appreciated that although a specific parent node 1106 is shown in FIG. 11, the parent node to a child node could alternatively be either one of the donor nodes or one of the other infrastructure equipment acting as relay nodes along any of the communications paths. Additionally, the child node 1108 may have a connection to more than one parent node.

In some arrangements of embodiments of the present technique, in advance of communicating by the child node with the donor node over the second communications path, the child node is configured to determine that a trigger condition for the child node to communicate with the donor node over the second communications path is satisfied, and to transmit, in response to determining that the trigger condition is satisfied, a route change command to either the parent node or one of the infrastructure equipment of the second communications path that is a target parent node for the child node, the route change command indicating that the child node should communicate with the donor node over the second communications path. Those skilled in the art would appreciate that, in embodiments of the present technique, "route change" could mean change from a current route to a known route, add a known route to a current route (i.e. operate in a dual connection mode) or replace or add to a current route with a previously unknown route.

The trigger of the route change may be one of a number of factors, such as:

The link quality is getting worse (determined through the measurements of received reference signals, from the parent node or elsewhere);

The link cannot guarantee the QoS requirement (for example delay requirement, which may be determined through reception of a broadcast or dedicated transmission from the parent node);

The parent relay node is overloaded (determined through reception of a broadcast or dedicated transmission from the parent node);

The route selection criterion is changed, for example to minimise the hop count so as to maximise network capacity (determined through notification from an upstream node, for example); or There is an uplink overflow (for example, the child node determines that it has more data to send than has resources allocated in the uplink grant, or no more uplink grant is being allocated).

In other words, the determining that the trigger condition is satisfied may comprise a determination, based on measurements performed by the child node on received reference symbols, that a link quality between two of the infrastructure equipment on the first communications path is below a threshold link quality. Here, the two of the infrastructure equipment may be the child node and the parent node. Alternatively, the determining that the trigger condition is satisfied may comprise a determination, based on the reception of one of a broadcast from the parent node and a dedicated transmission from the parent node to the child node, that at least one quality of service requirement cannot be guaranteed by the parent node. Alternatively, the determining that the trigger condition is satisfied may comprise a determination, based on the reception of one of a broadcast from the parent node and a dedicated transmission from the parent node to the child node, that a load at the parent node is above a threshold load. Alternatively, the determining that the trigger condition is satisfied may comprise a determination that the child node has more data to transmit to the parent node than can be transmitted in communications resources allocated to the child node for transmitting signals to the parent node.

The local assistance information associated with the child node that is transmitted by the child node to the donor node may comprise one or more of measurements of reference signals received by the child node, an indication of a buffer status of the child node, an indication of a current load status of the child node (including how much data is being received and/or is to be transmitted by the child node), and an indication of uplink communications resources allocated to the child node.

RRC Re-Establishment for RLF Recovery

When there is an issue with the connection between a child node and its parent IAB node (such as RLF), the child node may be pre-configured with alternative candidate route(s) and alternative candidate parent node(s), and so may be able to switch to these. In other words, the second communications path is a communications path known to the child node, and one of the one or more other infrastructure equipment acting as relay nodes of the second communications path is a parent node which is already known by and associated with the child node. However, it may be the case that, when such an issue occurs, the child node is not pre-configured with alternative candidate route(s) and alternative candidate parent node(s) that can be switched to in order to solve or alleviate the issue. In other words, the second communications path is a communications path not known to the child node, and none of the one or more other infrastructure equipment acting as relay nodes of the second communications path is a parent node which is already known by and associated with the child node.

When an RLF occurs, if a downstream (i.e. child) IAB node finds all its pre-configured upstream (i.e. parent) IAB nodes don't work, and there are no more new candidate routes being added, the downstream IAB node will need to initiate an RLF recovery procedure. It should be noted that it is the assumption of embodiments of the present technique that, for all the potential parent IAB nodes in the pre-configured route table, the child IAB node will get their configurations in advance, and it's up to the child node to decide which route should be activated. Of course, other implementations could apply, where for example the child node is instructed by a parent node (new or old) or donor node when a new route or parent IAB node should be added, activated or removed.

Figure 12:
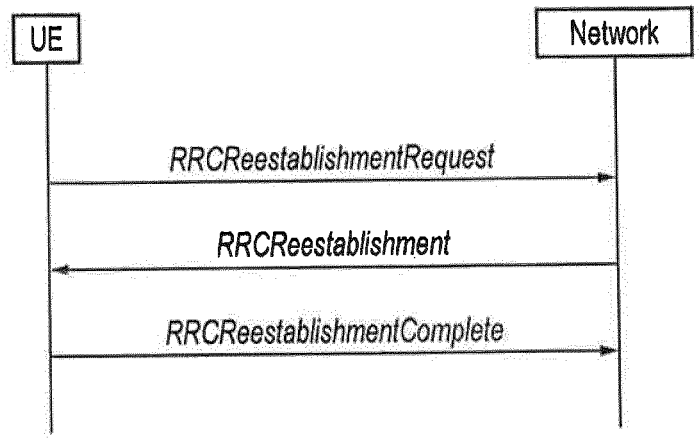
FIG. 12 is reproduced from [8], and shows an example of an RRC connection re-establishment procedure.
Figure 13:
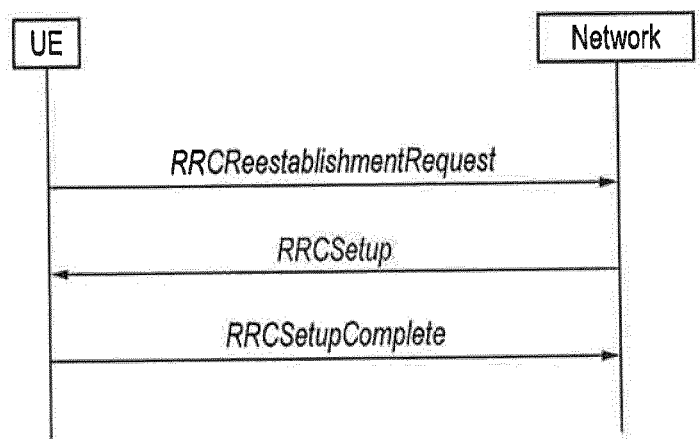
FIG. 13 is reproduced from [8], and shows an example of an RRC connection re-establishment procedure comprising a fallback to an RRC connection establishment procedure.

In an arrangement of embodiments of the present technique, the legacy radio resource control (RRC) re-establishment procedure can be re-used for the IAB RLF recovery procedure. Such a legacy procedure is illustrated by FIGS. 12 and 13, which are reproduced from [8]. The procedure is shown firstly in FIG. 12, where a UE (or in the case of the IAB RLF recovery procedure, the child node) requests re-establishment. This is then confirmed by and signalled to the UE (or child node) by the network (in the IAB RLF recovery procedure, this could be a current or potential parent node or donor node of the child node), which confirms that RRC re-establishment is complete. FIG. 13 shows the example where the network (or parent/donor node) is unable to retrieve or verify the UE (or child node) context, and instead of conducting re-establishment, performs a standard RRC connection establishment. In other words, the child node is configured to perform a Radio Resource Control, RRC, re-establishment procedure by transmitting an RRC re-establishment request to one of the other infrastructure equipment of the wireless communications network.

With respect to how to select the appropriate IAB node to send the RRCReestablishmentRequest to, the proposed criteria could be considered:

1) The appropriate node could be a node who broadcasts it is an IAB capable node.
2) The appropriate node could be a node who broadcasts with an indication of different hop number to the present parent node of the child node. It is sometimes the case that all of the upstream IAB nodes with shortest hop numbers don't work. Such a criterion may be especially useful when the route selection rule includes looking for the shortest path(s) from child node to donor node. In such a case, it is better to jump from this and go for a secondary optimum route with a greater number of hops.
3) The appropriate node could be an IAB node which has been designated by the network to have a higher priority.
4) The appropriate node could be a node who broadcasts and/or distributes the path cost of links (see the below arrangement relating to path cost).

Path Cost Calculation

In some arrangements of embodiments of the present technique, path cost is proposed as the criterion used in selection of a new parent node. As described above in relation to the wireless communications network of FIG. 11, local access assistance information is transmitted from each IAB node to the IAB donor node. Based on this local assistance information, the IAB donor node calculates a value of the communications criterion (i.e. the path cost) and distributes it to each IAB node in the network afterwards. Path cost is essentially a hypothetical cost value based on the link capacity/bandwidth between IAB nodes or along routes. In other words, the communications criterion associated with each of the first communications path and the one or more other communications paths is a path cost, the path cost being an indication of a total cost (for example, in terms of link capacity) between infrastructure equipment along the each of the first communications path and the one or more other communications paths (this may be all infrastructure equipment along that communications path to the donor node, or may be only from the child node to the parent node including any intermediate IAB nodes).

For example, assuming the following cost table reproduced from [9]:

TABLE I

Path cost calculation of IEEE 802.1D-1998 Spanning Tree Protocol (SPT).

| Link capacity | Cost |
|---|---|
| 10 Gbps | 2 |
| 1 Gbps | 4 |
| 100 Mbps | 19 |
| 10 Mbps | 100 |

In the conventional SPT, the path cost is simply defined based on link capacity, because the bandwidth is constant in a fixed line. On the other hand, the IAB link cost can not be defined by a straightforward definition. It could be variable and dynamically changed. For example, the link (channel) quality may have an impact on it, or the load of a node's processing may have an impact on it. There may be pre-defined preferences; for example, a node may have a good directional antenna. Therefore, the path cost, in the context of IAB networks, is no longer simply a one-to-one mapping of link capacity. The cost calculation may need to take multiple factors into account. For example, these factors may include the sum of link capacity, stability of channel quality, and the room of processing load at each node, etc.

Figure 14:
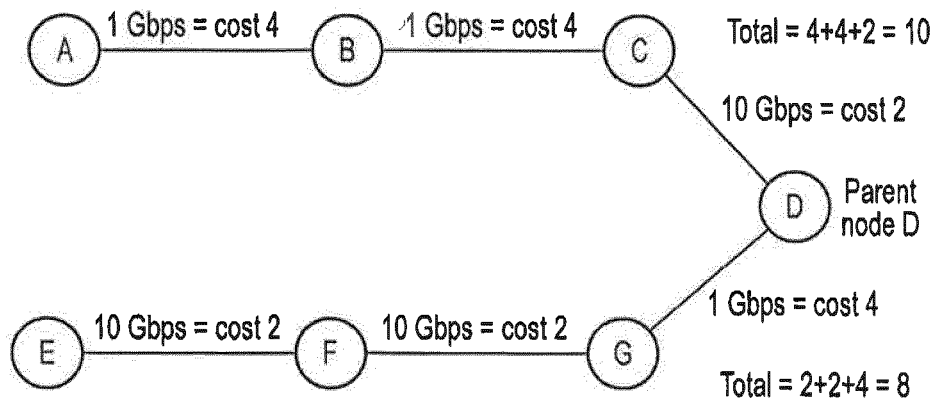
FIG. 14 shows an example of a conventional path cost calculation in accordance with embodiments of the present technique.

FIG. 14 shows an example of conventional path cost calculation. This calculation comprises simply cumulating the sum of each link cost. In the example of FIG. 14, each link has the same weight of cost calculation. There are two routes shown in FIG. 14 to reach the parent node D; these are route ABCD and route EFGD. Taking the sum of each link cost to calculate the path cost value:

Route ABCD; cost=4+4+2=10
Route EFGD; cost=2+2+4=8

In the conventional calculation example then as shown by FIG. 14, the cost of route ABCD is higher than that of route EFGD. When path cost is used as the communications criterion in the example wireless communications network of FIG. 11, the superior value is evidently the value among the candidate routes that is smaller. In this example, the superior value is the path cost of route EFGD, which would then be selected. Of course, when other communications criterion to path cost are used, the "superior" value could be the smallest value (e.g. for current load or traffic at an IAB parent node) or it could be the largest value (e.g. for link quality between the child node and candidate IAB parent nodes).

In the context of IAB, there is room to improve for the above path cost calculation. Firstly, the cost of links nearer to the parent node should be higher because the impact of congestion in that link is more severe; many UEs relay on the link closer to the parent/donor nodes as the IAB network structure as shown for example in FIG. 6B tends to pyramidal. Secondly, a smaller number of hops may be preferable for real-time applications/low latency applications where hop delay becomes a more pertinent issue. Thirdly, the current, average or expected processing load of each node could be taken into account for cost.

As described above, path cost cannot be defined for IAB links in the same straightforward manner of the conventional SPT. In some arrangements of embodiments of the present technique, the path cost may be an indication of a total (or average) link capacity between infrastructure equipment along the each of the first communications path and the one or more other communications paths. Alternatively, the path cost may be an indication of an average link (or channel) quality (this may be the highest average or total quality, or most stable quality) of each of the first communications path and the one or more other communications paths. Alternatively, the path cost may be an indication of a total (or average) load at the infrastructure equipment along the each of the first communications path and the one or more other communications paths. In some arrangements of embodiments of the present technique, the path cost may be a combination of two or more of the link capacity, link quality and load as described in this paragraph.

Figure 15:
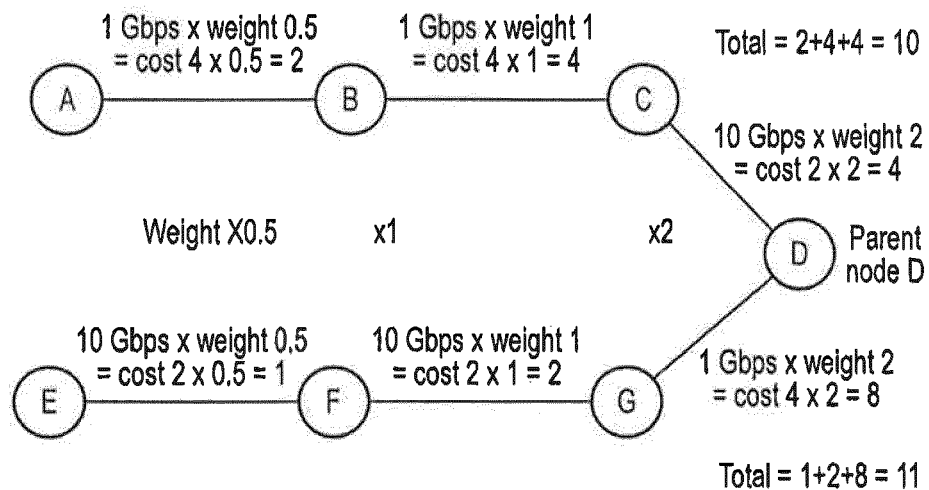
FIG. 15 shows an example of a weighted path cost calculation in accordance with embodiments of the present technique.

FIG. 15 shows an example of weighted path cost calculation. This means each link has a weight for determining cost calculation. For example, the link closer to a parent node has a larger weight (e.g. ×2), while the link further from the parent node has lower weight (e.g. ×0.5)—of course, in some examples, the link further from the parent node could have a higher weight than the link closer to a parent node. As in the conventional path cost calculation example of FIG. 14, there are two routes shown in FIG. 15 to reach the parent node D; these are route ABCD and route EFGD. Taking the sum of each weighted link cost to calculate the path cost value:

Route ABCD; cost=4*0.5+4*1+2*2=2+4+4=10
Route EFGD; cost=2*0.5+2*1+4*2=1+2+8=11

As a result, unlike the example shown in FIG. 14, the superior value is the path cost of route ABCD rather than EFGD, as route ABCD has a higher link capacity near the parent node which is deemed more important and thus weighted more heavily than EFGD which has a higher link capacity further from the parent node. Therefore, route ABCD is selected.

In other words, in the weighted path cost calculation example, the path cost is determined in accordance with weighting values associated with links between the infrastructure equipment along the each of the first communications path and the one or more other communications paths. A link from the child node to one of the infrastructure equipment along the each of the first communications path and the one or more other communications paths that is not a parent node may have a different weighting value (for example, a lower weighting value) than a link from the parent node to one of the infrastructure equipment along the each of the first communications path and the one or more other communications paths.

The nodes report the link capacity (quality) and the processing load to the network. Then, the network decides the weight of each link. The network may broadcast the link cost and its weight. Alternatively, each node may calculate the cost weight based on its own measurement and report this to the network.

Alternatively, each node may provide feedback comprising its local information (e.g. bandwidth, load information, link quality or in terms of L2 measurements for PRB usage, number of active UEs, data loss etc.) to the donor node. These measurements should be collected at regular time intervals so the decision is not delayed. The donor node will collect this information and calculate a weight/cost for each of the nodes. Afterwards, the donor node will distribute each node's weight/cost to them via dedicated signaling. For the CU-DU split architecture (i.e. architecture 1a as shown in FIG. 7), this information can be carried in an F1-AP message, and for non-split architecture this information can be carried in RRC/medium access control (MAC) message. It should be noted that if the local information has been changed, each node will update its information and signal this update to the donor node, and the donor node will re-distribute the weight/cost to those nodes.

Access Indication Signalling

Alternatively, the weight/cost (or another communications criterion such as load/traffic or link quality) could be turned into a simple value or indication (i.e. dependent on whether it surpasses a predetermined threshold or whether it is the best/superior value of all candidates) that access from downstream node is allowed/preferred or not. In some arrangements of embodiments of the present technique, after an IAB node gets such an indication from/via donor node, broadcast signalling is adopted to indicate it to its child node(s). In other words, the parent node transmits signalling information to the child node, the signalling information indicating the values of the communications criterion.

This access indication signalling can be broadcasted via system information, in a number of different ways. These include, but are not limited to:

- The indication can be included in MIB;
- The indication can be included in SIB1 as an independent field;
- The IAB related system information will be encapsulated in a separate SIB, e.g. IAB_SIB, and this SIB will be treated as any other on-demand SIBs;
- The IAB related system information will be encapsulated in a separate SIB, e.g. IAB_SIB, but the update of SIB will follow the public safety warning systems (such as Earthquake and Tsunami Warning System (ETWS) and Commercial Mobile Alert System (CMAS)) rule; that is no need to wait for the modification period.

Those skilled in the art would understand that sometimes, the IAB node may broadcast this indication to its downstream child nodes to indicate its availability/unavailability in case of, for example, it has detected its link is unstable, it is overloaded, etc., rather than only when it receives such an instruction from the donor node. In other words, the parent node transmits signalling information to the child node, the signalling information indicating the values of the communications criterion, wherein the values of the communication criterion indicate that whether or not the parent node is available for the child node to transmit signals to and/or to receive signals from.

Conditional RRC Connection Operation

In some arrangements of embodiments of the present technique, conditional RRC connection operation is proposed to realise the route change procedure. The backhaul link connection will potentially have an impact on many UEs (which may be spread through an IAB network such as shown with reference numeral 1120 in the example network of FIG. 11), so it is beneficial to accelerate the RLF recovery procedure when RLF (or an equivalent issue) occurs. The conditional connection operation procedure could be designed in accordance with the following:

- Upstream IAB nodes could send an RRC connection message with conditions on when to manage the RRC connection with downstream IAB nodes when the link quality is still acceptable;
- With those conditions included in the RRC message, the downstream IAB node can decide by itself when to deal with the RRC connection according to various conditions, e.g. not only because of link quality;
- The upstream IAB node can designate how to manage the RRC connection even when the link quality between the IAB nodes is still good enough, e.g. it's the problem between upstream node and its own upstream/parent node;
- In the condition message, the selection criteria to select a new upstream IAB node if necessary could be included.

In other words, in an arrangement of embodiments of the present technique, the parent node is configured to transmit an RRC connection message comprising an indication of one or more predetermined conditions to the child node, wherein the child node is to manage its connection with the parent node in response to determining that one of the predetermined conditions has been satisfied. In some arrangements, as described below, the child node is to manage its connection with the parent node by releasing its connection with the parent node. The one or more predetermined conditions may comprise at least one of: a link quality between the parent node and the child node or the parent node and another of the infrastructure equipment falling below a threshold, a radio link failure, RLF, between the child node and the parent node, the parent node being blocked, and the parent node being overloaded.

Figure 16:
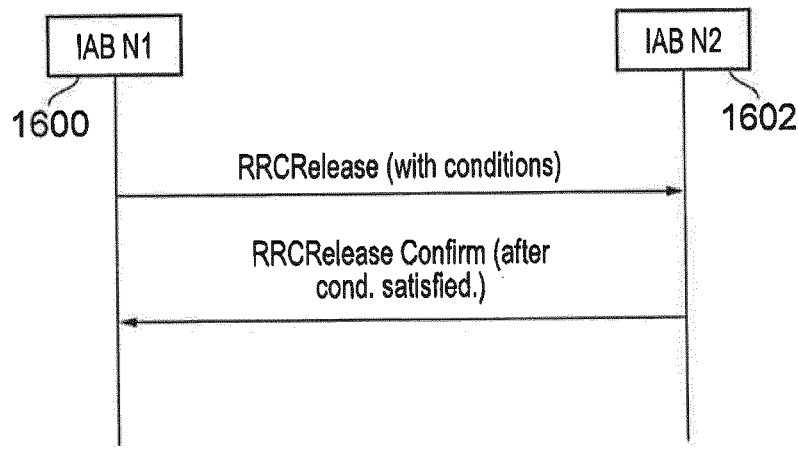
FIG. 16 shows an example of a conditional RRC connection release procedure in accordance with embodiments of the present technique.

The procedure is depicted as follows, in respect of the above described arrangement of embodiments of the present disclosure of conditional RRC connection release, with reference to FIG. 16:

- The IAB node 1 1600 will send RRC connection release message to the IAB node 2 1602 with an indication of certain conditions, such as:
  - How long the RRC connection will be released for;
  - When the link quality is below certain threshold;
  - When RLF happens, e.g. out of sync;
  - When the node is blocked;
  - When the node is overloaded;
  - as well as recommended selection criteria as listed above. It should be noted that with different conditions, the selection criteria could be different. Examples of such selection criteria could be minimum hop numbers, best link quality, and information on the backup route node or the priority of different routes. In other words, the RRC connection message may comprise an indication of one or more selection criteria for selecting a new parent node for the child node from among the other infrastructure equipment, the one or more selection criteria comprising: a number of hops between the child node and the new parent node being lower than between the child node and other candidate parent nodes, a link quality between the child node and the new parent node being higher than between the child node and the other candidate parent nodes, and a priority of the new parent node being higher than a priority of the other candidate parent nodes.
- A backup route may be visible to the end node (i.e. child node), but indicated as low priority. Only when the routes with high priority become unusable, will the backup route will be triggered. Such route priority information and backup route trigger information can be included in the condition message. Alternatively, a backup route may be invisible to the child node, but is included in the condition message to certain IAB nodes (e.g. those with stringent traffic requirement nodes). In other words, the RRC connection message may comprise an indication of the second communications path, the second communications path being a backup communications path to and having a lower priority than the first communications path.
- If the condition is satisfied, JAB node 2 1602 will release the RRC connection with IAB node 1 1601 and send confirmation to IAB node 1 1601, after which IAB node 1 1601 could release the resources to IAB node 2 1602. It should be noted that, depending on the architecture (see FIGS. 7, 8 and 9), the message may be forwarded to the IAB donor node.

Figure 17:
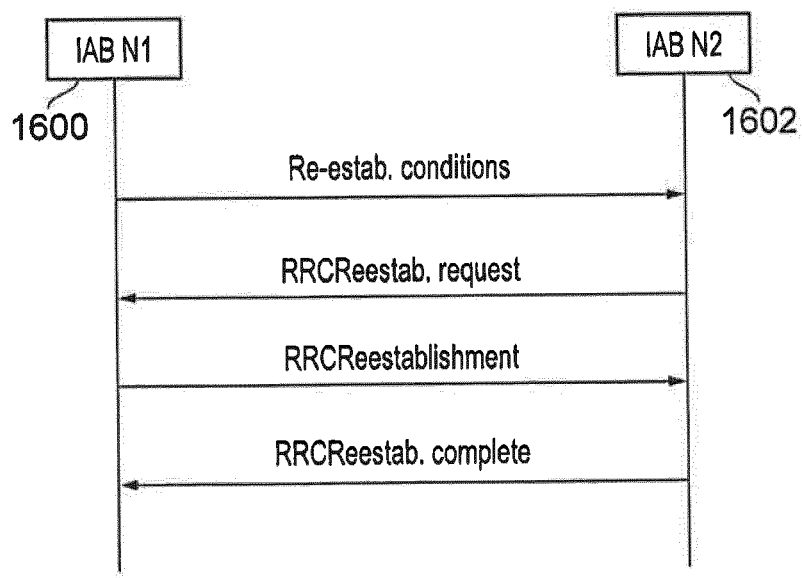
FIG. 17 shows an example of a conditional RRC connection re-establishment procedure in accordance with embodiments of the present technique.

As an alternative arrangement, the RRC re-establishment procedure could be re-used with conditions included in previous RRC messages, e.g. RRC reconfiguration message. An example of this is shown in FIG. 17. With such predefined conditions, the downstream IAB node can initiate the re-establishment procedure without waiting until the link is out-of-sync. In other words, in this alternative arrangement, the child node is to manage its connection with the parent node by performing an RRC re-establishment procedure by transmitting an RRC re-establishment request to one of the other infrastructure equipment of the wireless communications network.

Flow Chart Representation

Figure 18:
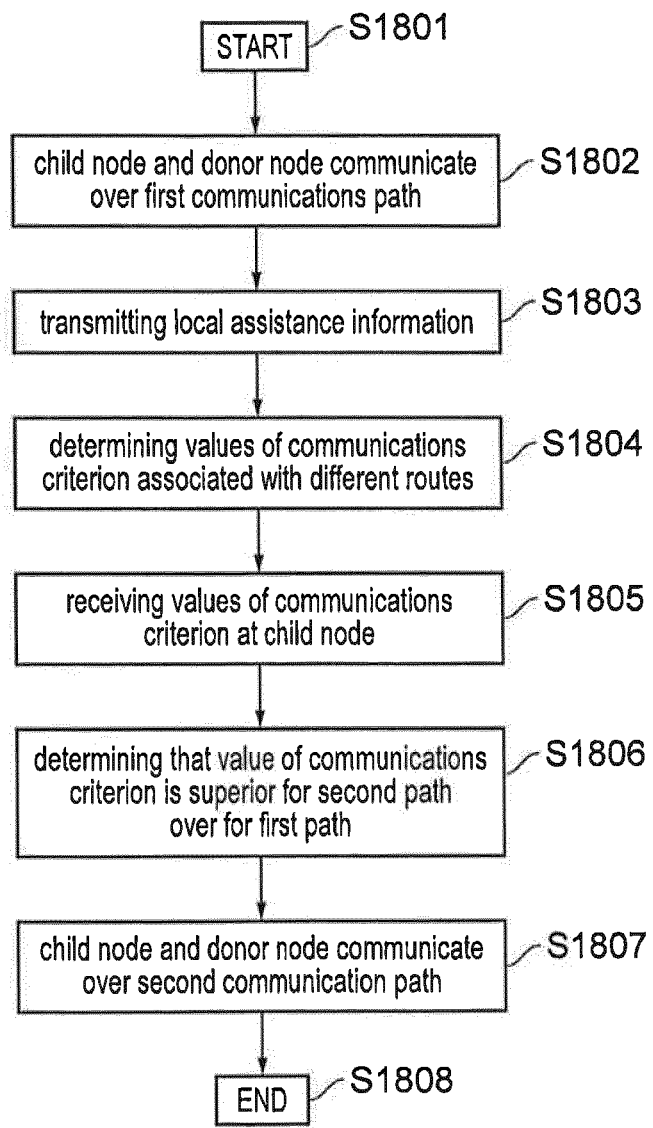
FIG. 18 shows a flow diagram illustrating a process of communications in a communications system in accordance with embodiments of the present technique.

FIG. 18 shows a flow diagram illustrating a process of communications in a communications system in accordance with embodiments of the present technique. The process shown by FIG. 18 is a method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link.

The method begins in step S1801. The method comprises, in step S1802, communicating, with a first of the infrastructure equipment acting as a donor node connected to a core network, the core network being part of the wireless communications network, signals representing data by a second of the infrastructure equipment over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node. In step S1803, the method comprises transmitting, by the child node to the donor node over the first communications path, local assistance information associated with the child node. In step S1804, the process comprises determining, by the donor node based on the local assistance information associated with the child node, values of a communications criterion associated with each of the first communications path and one or more other communications paths between the child node and either the donor node or a second donor node via one or more others of the infrastructure equipment acting as relay nodes, the first communications path and the one or more other communications paths being different. In step S1805, the process involves receiving, by the child node from the donor node via the parent node or from the parent node, the values of the communications criterion associated with each of the first communications path and the one or more other communications paths, and in step S1806, the method comprises determining, by the child node, that the value of the communications criterion associated with a second communications path which is one of the one or more other communications paths is superior to the value of the communications criterion associated with the first communications path. The method then moves to step S1807, which comprises communicating, by the child node, with the donor node over the second communications path. It should be noted that if the child node does not determine in step S1806 that the value of the communications criterion associated with the second communications path is superior to the value of the communications criterion associated with the first communications path, then the child node will not communicate with the donor node over the second communications path instead of the first communications path. The process ends in step S1808.

Those skilled in the art would appreciate that the method shown by FIG. 18 may be adapted in accordance with embodiments of the present technique. For example, other intermediate steps may be included in the method, or the steps may be performed in any logical order.

Though embodiments of the present technique have been described largely by way of the example system shown in FIG. 11, it would be clear to those skilled in the art that they could be equally applied to other systems, where for example there may be many more nodes or paths to choose from, or more hops between the donor and end nodes.

Those skilled in the art would also appreciate that such infrastructure equipment and/or wireless communications networks as herein defined may be further defined in accordance with the various arrangements and embodiments discussed in the preceding paragraphs. It would be further appreciated by those skilled in the art that such infrastructure equipment and wireless communications networks as herein defined and described may form part of communications systems other than those defined by the present invention.

The following numbered paragraphs provide further example aspects and features of the present technique:

Paragraph 1. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising communicating, with a first of the infrastructure equipment acting as a donor node connected to a core network, the core network being part of the wireless communications network, signals representing data by a second of the infrastructure equipment over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, transmitting, by the child node to the donor node over the first communications path, local assistance information associated with the child node, determining, by the donor node based on the local assistance information associated with the child node, values of a communications criterion associated with each of the first communications path and one or more other communications paths between the child node and either the donor node or a second donor node via one or more others of the infrastructure equipment acting as relay nodes, the first communications path and the one or more other communications paths being different, receiving, by the child node from the donor node via the parent node or from the parent node, the values of the communications criterion associated with each of the first communications path and the one or more other communications paths, determining, by the child node, that the value of the communications criterion associated with a second communications path which is one of the one or more other communications paths is superior to the value of the communications criterion associated with the first communications path, and communicating, by the child node, with the donor node over the second communications path.

Paragraph 2. A method according to Paragraph 1, wherein the second communications path is a communications path known to the child node, and one of the one or more other infrastructure equipment acting as relay nodes of the second communications path is a parent node which is already known by and associated with the child node.

Paragraph 3. A method according to Paragraph 1 or Paragraph 2, wherein the second communications path is a communications path not known to the child node, and none of the one or more other infrastructure equipment acting as relay nodes of the second communications path is a parent node which is already known by and associated with the child node.

Paragraph 4. A method according to Paragraph 3, comprising performing a Radio Resource Control, RRC, re-establishment procedure by transmitting an RRC re-establishment request to one of the other infrastructure equipment of the wireless communications network.

Paragraph 5. A method according to any of Paragraphs 1 to 4, wherein the communications criterion associated with each of the first communications path and the one or more other communications paths is a path cost, the path cost being an indication of a total cost between infrastructure equipment along the each of the first communications path and the one or more other communications paths.

Paragraph 6. A method according to Paragraph 5, wherein the path cost is an indication of a total link capacity between infrastructure equipment along the each of the first communications path and the one or more other communications paths.

Paragraph 7. A method according to Paragraph 5, wherein the path cost is an indication of an average link quality of each of the first communications path and the one or more other communications paths.

Paragraph 8. A method according to Paragraph 5, wherein the path cost is an indication of a total load at the infrastructure equipment along the each of the first communications path and the one or more other communications paths.

Paragraph 9. A method according to Paragraph 5, wherein the path cost is an indication of a combination of two or more of a total link capacity between infrastructure equipment along the each of the first communications path and the one or more other communications paths, an average link quality of each of the first communications path and the one or more other communications paths, and a total load at the infrastructure equipment along the each of the first communications path and the one or more other communications paths.

Paragraph 10. A method according to any of Paragraphs 5 to 9, wherein the path cost is determined in accordance with weighting values associated with links between the infrastructure equipment along the each of the first communications path and the one or more other communications paths.

Paragraph 11. A method according to Paragraph 10, wherein a link from the child node to one of the infrastructure equipment along the each of the first communications path and the one or more other communications paths that is not a parent node has a different weighting value than a link from the parent node to one of the infrastructure equipment along the each of the first communications path and the one or more other communications paths.

Paragraph 12. A method according to any of Paragraphs 1 to 11, comprising, in advance of communicating by the child node with the donor node over the second communications path, determining, by the child node, that a trigger condition for the child node to communicate with the donor node over the second communications path is satisfied, and transmitting, by the child node in response to determining that the trigger condition is satisfied, a route change command to either the parent node or one of the infrastructure equipment of the second communications path that is a target parent node for the child node, the route change command indicating that the child node should communicate with the donor node over the second communications path.

Paragraph 13. A method according to Paragraph 12, wherein the determining that the trigger condition is satisfied comprises a determination, based on measurements performed by the child node on received reference symbols, that a link quality between two of the infrastructure equipment on the first communications path is below a threshold link quality.

Paragraph 14. A method according to Paragraph 13, wherein the two of the infrastructure equipment are the child node and the parent node.

Paragraph 15. A method according to any of Paragraphs 12 to 14, wherein the determining that the trigger condition is satisfied comprises a determination, based on the reception of one of a broadcast from the parent node and a dedicated transmission from the parent node to the child node, that at least one quality of service requirement cannot be guaranteed by the parent node.

Paragraph 16. A method according to any of Paragraphs 12 to 15, wherein the determining that the trigger condition is satisfied comprises a determination, based on the reception of one of a broadcast from the parent node and a dedicated transmission from the parent node to the child node, that a load at the parent node is above a threshold load.

Paragraph 17. A method according to any of Paragraphs 12 to 16, wherein the determining that the trigger condition is satisfied comprises a determination that the child node has more data to transmit to the parent node than can be transmitted in communications resources allocated to the child node for transmitting signals to the parent node.

Paragraph 18. A method according to any of Paragraphs 1 to 17, wherein the parent node transmits signalling information to the child node, the signalling information indicating the values of the communications criterion.

Paragraph 19. A method according to Paragraph 18, wherein the signalling information is transmitted by the parent node in a Master Information Block, MIB.

Paragraph 20. A method according to Paragraph 18 or Paragraph 19, wherein the signalling information is transmitted by the parent node in a first of one or more System Information Blocks, SIB1.

Paragraph 21. A method according to any of Paragraphs 18 to 20, wherein the signalling information is transmitted by the parent node in a SIB that is dedicated for IAB related system information, wherein the SIB may be updated during a modification period specified by further system information.

Paragraph 22. A method according to any of Paragraphs 18 to 21, wherein the signalling information is transmitted by the parent node in a SIB that is dedicated for IAB related system information, wherein the SIB may be updated during or outside a modification period specified by further system information.

Paragraph 23. A method according to any of Paragraphs 18 to 22, wherein the values of the communication criterion indicate that whether or not the parent node is available for the child node to transmit signals to and/or to receive signals from.

Paragraph 24. A method according to any of Paragraphs 1 to 23, comprising
  transmitting, by the parent node to the child node, an RRC connection message comprising an indication of one or more predetermined conditions, wherein the child node is to manage its connection with the parent node in response to determining that one of the predetermined conditions has been satisfied.

Paragraph 25. A method according to Paragraph 24, wherein the child node is to manage its connection with the parent node by releasing its connection with the parent node.

Paragraph 26. A method according to Paragraph 24 or Paragraph 25, wherein the child node is to manage its connection with the parent node by performing an RRC re-establishment procedure by transmitting an RRC re-establishment request to one of the other infrastructure equipment of the wireless communications network.

Paragraph 27. A method according to any of Paragraphs 24 to 26, wherein the one or more predetermined conditions comprise at least one of: a link quality between the parent node and the child node or the parent node and another of the infrastructure equipment falling below a threshold, a radio link failure, RLF, between the child node and the parent node, the parent node being blocked, and the parent node being overloaded.

Paragraph 28. A method according to any of Paragraphs 24 to 27, wherein the RRC connection message comprises an indication of one or more selection criteria for selecting a new parent node for the child node from among the other infrastructure equipment, the one or more selection criteria comprising: a number of hops between the child node and the new parent node being lower than between the child node and other candidate parent nodes, a link quality between the child node and the new parent node being higher than between the child node and the other candidate parent nodes, and a priority of the new parent node being higher than a priority of the other candidate parent nodes.

Paragraph 29. A method according to any of Paragraphs 24 to 28, wherein the RRC connection message comprises an indication of the second communications path, the second communications path being a backup communications path to and having a lower priority than the first communications path.

Paragraph 30. A method according to any of Paragraphs 1 to 29, wherein the local assistance information comprises one or more of measurements of reference signals received by the child node, an indication of a buffer status of the child node, an indication of a current load status of the child node, and an indication of uplink communications resources allocated to the child node.

Paragraph 31. A wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured
  to communicate, with a first of the infrastructure equipment acting as a donor node connected to a core network, the core network being part of the wireless communications network, signals representing data over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, and
  to transmit, to the donor node over the first communications path, local assistance information associated with the child node, and the donor node is configured
  to determine, based on the local assistance information associated with the child node, values of a communications criterion associated with each of the first communications path and one or more other communications paths between the child node and either the donor node or a second donor node via one or more others of the infrastructure equipment acting as relay nodes, the first communications path and the one or more other communications paths being different, and the child node is configured
  to receive, from the donor node via the parent node or from the parent node, the values of the communications criterion associated with each of the first communications path and the one or more other communications paths,
  to determine that the value of the communications criterion associated with a second communications path which is one of the one or more other communications paths is superior to the value of the communications criterion associated with the first communications path, and
  to communicate with the donor node over the second communications path.

Paragraph 32. Circuitry for a wireless communications network comprising a plurality of infrastructure equipment each being configured to communicate with one or more others of the infrastructure equipment via a backhaul communications link, one or more of the infrastructure equipment each being configured
  to communicate with one or more communications devices via an access link, wherein a second of the infrastructure equipment is configured
  to communicate, with a first of the infrastructure equipment acting as a donor node connected to a core network, the core network being part of the wireless communications network, signals representing data over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, and
  to transmit, to the donor node over the first communications path, local assistance information associated with the child node, and the donor node is configured
  to determine, based on the local assistance information associated with the child node, values of a communications criterion associated with each of the first communications path and one or more other communications paths between the child node and either the donor node or a second donor node via one or more others of the infrastructure equipment acting as relay nodes, the first communications path and the one or more other communications paths being different, and the child node is configured to receive, from the donor node via the parent node or from the parent node, the values of the communications criterion associated with each of the first communications path and the one or more other communications paths, to determine that the value of the communications criterion associated with a second communications path which is one of the one or more other communications paths is superior to the value of the communications criterion associated with the first communications path, and to communicate with the donor node over the second communications path.

Paragraph 33. A method of operating a infrastructure equipment forming part of a wireless communications network comprising a plurality of other infrastructure equipment, the infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, the method comprising communicating, with a first of the infrastructure equipment acting as a donor node connected to a core network, the core network being part of the wireless communications network, signals representing data over a first communications path via one or more others of the infrastructure equipment acting as relay nodes, the infrastructure equipment being a child node and one of the one or more other infrastructure equipment acting as the relay nodes or the donor node being a parent node, the child node being connected to the parent node via a backhaul communications link and configured to receive uplink communications resources allocations from the parent node, transmitting, to the donor node over the first communications path, local assistance information associated with the child node, receiving, from the donor node via the parent node or from the parent node, values of the communications criterion associated with each of the first communications path and the one or more other communications paths between the child node and either the donor node or a second donor node via one or more others of the infrastructure equipment acting as relay nodes, the first communications path and the one or more other communications paths being different, the values of the communications criterion being determined by the donor node based on the local assistance information associated with the child node, determining that the value of the communications criterion associated with a second communications path which is one of the one or more other communications paths is superior to the value of the communications criterion associated with the first communications path, and communicating with the donor node over the second communications path.

Paragraph 34. A infrastructure equipment forming part of a wireless communications network comprising a plurality of other infrastructure equipment, the infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the infrastructure comprises transceiver circuitry and controller circuitry which are configured in combination to communicate, with a first of the infrastructure equipment acting as a donor node connected to a core network, the core network being part of the wireless communications network, signals representing data over a first communications path via one or more others of the infrastructure equipment acting as relay nodes, the infrastructure equipment being a child node and one of the one or more other infrastructure equipment acting as the relay nodes or the donor node being a parent node, the child node being connected to the parent node via a backhaul communications link and configured to receive uplink communications resources allocations from the parent node, to transmit, to the donor node over the first communications path, local assistance information associated with the child node, to receive, from the donor node via the parent node or from the parent node, values of the communications criterion associated with each of the first communications path and the one or more other communications paths between the child node and either the donor node or a second donor node via one or more others of the infrastructure equipment acting as relay nodes, the first communications path and the one or more other communications paths being different, the values of the communications criterion being determined by the donor node based on the local assistance information associated with the child node, to determine that the value of the communications criterion associated with a second communications path which is one of the one or more other communications paths is superior to the value of the communications criterion associated with the first communications path, and to communicate with the donor node over the second communications path.

Paragraph 35. Circuitry for a infrastructure equipment forming part of a wireless communications network comprising a plurality of other infrastructure equipment, the infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the infrastructure comprises transceiver circuitry and controller circuitry which are configured in combination to communicate, with a first of the infrastructure equipment acting as a donor node connected to a core network, the core network being part of the wireless communications network, signals representing data over a first communications path via one or more others of the infrastructure equipment acting as relay nodes, the infrastructure equipment being a child node and one of the one or more other infrastructure equipment acting as the relay nodes or the donor node being a parent node, the child node being connected to the parent node via a backhaul communications link and configured to receive uplink communications resources allocations from the parent node, to transmit, to the donor node over the first communications path, local assistance information associated with the child node, to receive, from the donor node via the parent node or from the parent node, values of the communications criterion associated with each of the first communications path and the one or more other communications paths between the child node and either the donor node or a second donor node via one or more others of the infrastructure equipment acting as relay nodes, the first communications path and the one or more other communications paths being different, the values of the communications criterion being determined by the donor node based on the local assistance information associated with the child node, to determine that the value of the communications criterion associated with a second communications path which is one of the one or more other communications paths is superior to the value of the communications criterion associated with the first communications path, and to communicate with the donor node over the second communications path.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-161901, "Revised work item proposal: Enhancements of NB-IoT", Huawei, HiSilicon, 3GPP TSG RAN Meeting #73, New Orleans, USA, Sep. 19-22, 2016.

[3] RP-170831, "New SID Proposal: Study on Integrated Access and Backhaul for NR", AT&T, 3GPP RAN Meeting #75, Dubrovnik, Croatia, March 2017.

[4] 3GPP TTR 38.874 "$3^{rd}$ Generation Partnership Project; Technical Specification Group Radio Access Network; Study on Integrated Access and Backhaul; (Release 15)", $3^{rd}$ Generation Partnership Project, February 2018.

[5] R2-1801606, "Proposals on IAB Architecture", Qualcomm et al, 3GPP TSG-RAN WG2 NR Ad hoc 1801, Vancouver, Canada, Jan. 22-26, 2018.

[6] R3-181502, "Way Forward—IAB Architecture for L2/3 relaying", Qualcomm et al, 3GPP TSG-RAN WG3 Meeting #99, Athens, Greece, Feb. 26-Mar. 2, 2018.

[7] R3-185312, "IAB failure recovery as part of route management", Samsung, 3GPP TSG-RAN WG3 Meeting #101, Gothenburg, Sweden, Aug. 20-24, 2018.

[8] 3GPP TS 38.331 (V15.3.0), "$3^{rd}$ Generation Partnership Project; Technical Specification Group Radio Access Network; NR; Radio Resource Control (RRC) protocol specification (Release 15)", $3^{rd}$ Generation Partnership Project, September 2018.

[9] "802.1Q-2014—Bridges and Bridged Networks", IEEE, December 2014.

What is claimed is:

1. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising communicating, with a first of the infrastructure equipment acting as a donor node connected to a core network, the core network being part of the wireless communications network, signals representing data by a second of the infrastructure equipment over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, transmitting, by the child node to the donor node over the first communications path, local assistance information associated with the child node, determining, by the donor node based on the local assistance information associated with the child node, values of a communications criterion associated with each of the first communications path and one or more other communications paths between the child node and either the donor node or a second donor node via one or more others of the infrastructure equipment acting as relay nodes, the first communications path and the one or more other communications paths being different, receiving, by the child node from the donor node via the parent node or from the parent node, the values of the communications criterion associated with each of the first communications path and the one or more other communications paths, determining, by the child node, that the value of the communications criterion associated with a second communications path which is one of the one or more other communications paths is superior to the value of the communications criterion associated with the first communications path, and communicating, by the child node, with the donor node over the second communications path.

2. A method according to claim 1, wherein the second communications path is a communications path known to the child node, and one of the one or more other infrastructure equipment acting as relay nodes of the second communications path is a parent node which is already known by and associated with the child node.

3. A method according to claim 1, wherein the second communications path is a communications path not known to the child node, and none of the one or more other infrastructure equipment acting as relay nodes of the second communications path is a parent node which is already known by and associated with the child node.

4. A method according to claim 3, comprising
performing a Radio Resource Control, RRC, re-establishment procedure by transmitting an RRC re-establishment request to one of the other infrastructure equipment of the wireless communications network.

5. A method according to claim 1, wherein the communications criterion associated with each of the first communications path and the one or more other communications paths is a path cost, the path cost being an indication of a total cost between infrastructure equipment along the each of the first communications path and the one or more other communications paths.

6. A method according to claim 5, wherein the path cost is an indication of a total link capacity between infrastructure equipment along the each of the first communications path and the one or more other communications paths.

7. A method according to claim 5, wherein the path cost is an indication of an average link quality of each of the first communications path and the one or more other communications paths.

8. A method according to claim 5, wherein the path cost is an indication of a total load at the infrastructure equipment along the each of the first communications path and the one or more other communications paths.

9. A method according to claim 5, wherein the path cost is an indication of a combination of two or more of a total link capacity between infrastructure equipment along the each of the first communications path and the one or more other communications paths, an average link quality of each of the first communications path and the one or more other communications paths, and a total load at the infrastructure equipment along the each of the first communications path and the one or more other communications paths.

10. A method according to claim 5, wherein the path cost is determined in accordance with weighting values associated with links between the infrastructure equipment along the each of the first communications path and the one or more other communications paths.

11. A method according to claim 1, comprising, in advance of communicating by the child node with the donor node over the second communications path,
determining, by the child node, that a trigger condition for the child node to communicate with the donor node over the second communications path is satisfied, and
transmitting, by the child node in response to determining that the trigger condition is satisfied, a route change command to either the parent node or one of the infrastructure equipment of the second communications path that is a target parent node for the child node, the route change command indicating that the child node should communicate with the donor node over the second communications path.

12. A method according to claim 11, wherein the determining that the trigger condition is satisfied comprises a determination, based on measurements performed by the child node on received reference symbols, that a link quality between two of the infrastructure equipment on the first communications path is below a threshold link quality.

13. A method according to claim 11, wherein the determining that the trigger condition is satisfied comprises a determination, based on the reception of one of a broadcast from the parent node and a dedicated transmission from the parent node to the child node, that at least one quality of service requirement cannot be guaranteed by the parent node.

14. A method according to claim 11, wherein the determining that the trigger condition is satisfied comprises a determination, based on the reception of one of a broadcast from the parent node and a dedicated transmission from the parent node to the child node, that a load at the parent node is above a threshold load.

15. A method according to claim 11, wherein the determining that the trigger condition is satisfied comprises a determination that the child node has more data to transmit to the parent node than can be transmitted in communications resources allocated to the child node for transmitting signals to the parent node.

16. A method according to claim 1, wherein the parent node transmits signalling information to the child node, the signalling information indicating the values of the communications criterion.

17. A method according to claim 16, wherein the signalling information is transmitted by the parent node in a SIB that is dedicated for IAB related system information, wherein the SIB may be updated during a modification period specified by further system information.

18. A method according to claim 1, comprising
transmitting, by the parent node to the child node, an RRC connection message comprising an indication of one or more predetermined conditions, wherein the child node is to manage its connection with the parent node in response to determining that one of the predetermined conditions has been satisfied.

19. Circuitry for a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured
to communicate, with a first of the infrastructure equipment acting as a donor node connected to a core network, the core network being part of the wireless communications network, signals representing data over a first communications path via one or more others of the infrastructure equipment acting as relay nodes, the second infrastructure equipment being a child node and one of the one or more other infrastructure equipment acting as the relay nodes or the donor node being a parent node, the parent node being connected to the child node via a backhaul communications link and configured to allocate uplink communications resources to the child node, and
to transmit, to the donor node over the first communications path, local assistance information associated with the child node, and the donor node is configured
to determine, based on the local assistance information associated with the child node, values of a communications criterion associated with each of the first communications path and one or more other communications paths between the child node and either the donor node or a second donor node via one or more others of the infrastructure equipment acting as relay nodes, the first communications path and the one or more other communications paths being different, and the child node is configured

- to receive, from the donor node via the parent node or from the parent node, the values of the communications criterion associated with each of the first communications path and the one or more other communications paths,
- to determine that the value of the communications criterion associated with a second communications path which is one of the one or more other communications paths is superior to the value of the communications criterion associated with the first communications path, and
- to communicate with the donor node over the second communications path.

20. Circuitry for a infrastructure equipment forming part of a wireless communications network comprising a plurality of other infrastructure equipment, the infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the infrastructure comprises transceiver circuitry and controller circuitry which are configured in combination

- to communicate, with a first of the infrastructure equipment acting as a donor node connected to a core network, the core network being part of the wireless communications network, signals representing data over a first communications path via one or more others of the infrastructure equipment acting as relay nodes, the infrastructure equipment being a child node and one of the one or more other infrastructure equipment acting as the relay nodes or the donor node being a parent node, the child node being connected to the parent node via a backhaul communications link and configured to receive uplink communications resources allocations from the parent node,
- to transmit, to the donor node over the first communications path, local assistance information associated with the child node,
- to receive, from the donor node via the parent node or from the parent node, values of the communications criterion associated with each of the first communications path and the one or more other communications paths between the child node and either the donor node or a second donor node via one or more others of the infrastructure equipment acting as relay nodes, the first communications path and the one or more other communications paths being different, the values of the communications criterion being determined by the donor node based on the local assistance information associated with the child node,
- to determine that the value of the communications criterion associated with a second communications path which is one of the one or more other communications paths is superior to the value of the communications criterion associated with the first communications path, and
- to communicate with the donor node over the second communications path.

\* \* \* \* \*